(12) United States Patent
Glaser et al.

(10) Patent No.: US 11,250,606 B2  
(45) Date of Patent: Feb. 15, 2022

(54) PRIVACY PROTECTION IN VISION SYSTEMS

(71) Applicant: Grabango Co., Berkeley, CA (US)

(72) Inventors: William Glaser, Berkeley, CA (US); Kevin Rauwolf, Berkeley, CA (US)

(73) Assignee: Grabango Co., Berkeley, CA (US)

( * ) Notice: Subject to any disclaimer, the term of this patent is extended or adjusted under 35 U.S.C. 154(b) by 0 days.

(21) Appl. No.: 16/945,754

(22) Filed: Jul. 31, 2020

(65) Prior Publication Data

US 2021/0035342 A1 Feb. 4, 2021

Related U.S. Application Data

(60) Provisional application No. 62/881,255, filed on Jul. 31, 2019.

(51) Int. Cl.
| | |
|---|---|
| *G06T 11/60* | (2006.01) |
| *G06K 9/00* | (2006.01) |
| *G06K 9/46* | (2006.01) |
| *G06T 7/11* | (2017.01) |

(52) U.S. Cl.
CPC .......... *G06T 11/60* (2013.01); *G06K 9/00335* (2013.01); *G06K 9/4671* (2013.01); *G06T 7/11* (2017.01)

(58) Field of Classification Search
CPC ....... G06T 11/60; G06T 7/11; G06K 9/00335; G06K 9/4671
See application file for complete search history.

(56) References Cited

U.S. PATENT DOCUMENTS

| | | | |
|---|---|---|---|
| 2012/0206452 A1* | 8/2012 | Geisner | H04S 7/304 345/419 |
| 2017/0067739 A1* | 3/2017 | Siercks | H04N 5/23296 |
| 2019/0147185 A1* | 5/2019 | Cai | G06F 21/6245 726/30 |
| 2019/0228182 A1* | 7/2019 | Einecke | G06F 21/602 |
| 2019/0355100 A1* | 11/2019 | Kimura | G06T 7/70 |
| 2020/0098096 A1* | 3/2020 | Moloney | G06K 9/00771 |
| 2020/0202541 A1* | 6/2020 | Porat | G06T 7/215 |

* cited by examiner

*Primary Examiner* — David T Welch

(74) *Attorney, Agent, or Firm* — Alpine Patents LLC; Brian Van Osdol

(57) ABSTRACT

A system and method for privacy protection in vision systems that can include collecting image data from an environment; collecting spatial information corresponding to the image data; selecting a sanitization image region in the image data based at least in part on the spatial information; and applying image sanitization to the sanitization image region thereby generating sanitized image data.

19 Claims, 21 Drawing Sheets

PRIVACY PROTECTION IN VISION SYSTEMS

CROSS-REFERENCE TO RELATED APPLICATIONS

This application claims the benefit of U.S. Provisional Application No. 62/881,255, filed on 31 Jul. 2019, which is incorporated in its entirety by this reference.

TECHNICAL FIELD

This invention relates generally to the field of computer vision, and more specifically to a new and useful system and method for privacy protection in vision systems.

BACKGROUND

Video monitoring has long been used in monitoring environments, mostly for security purposes. Advances in computer vision (CV) are leading to a growth in video surveillance. Cameras are finding new uses in a growing number of environments, but in some cases can be limited in their usage due to user privacy. Existing solutions are not equipped to properly secure user privacy and the solutions that do exist, crudely address the issue of securing privacy.

Many existing solutions use gross object detection of 2D image data and a simplistic redaction or blurring of the associated region in the 2D image data. There are video and image systems that use basic object recognition for the purposes of obscuring certain regions. For example, facial detection is used to automatically blur faces of people in an image. In another example, license plate tag detection is used to blur license plates of cars in images of roads and cities.

This technique is not well suited for robust protection of privacy. Many objects and activities cannot be addressed by such a simple approach. For example, a partial view of an object may not trigger object detection and thereby be a privacy exposure while not redacted or blurred.

Furthermore, there are new and emerging image or video based computer services and applications that benefit from generating a richer understanding of the activity in an environment. Existing solutions are poorly suited for such computer services and application. The existing privacy focused solutions can interfere or even prevent the capabilities of such a system, while also being poorly equipped to robustly secure privacy.

Thus, there is a need in the video monitoring field to create a new and useful system and method for automatic privacy preservation for personal devices and kiosks in public spaces. This invention provides such a new and useful system and method.

Thus, there is a need in the computer vision field to create a new and useful system and method for privacy protection in vision systems. This invention provides such a new and useful system and method.

DESCRIPTION OF THE EMBODIMENTS

Figure 1:
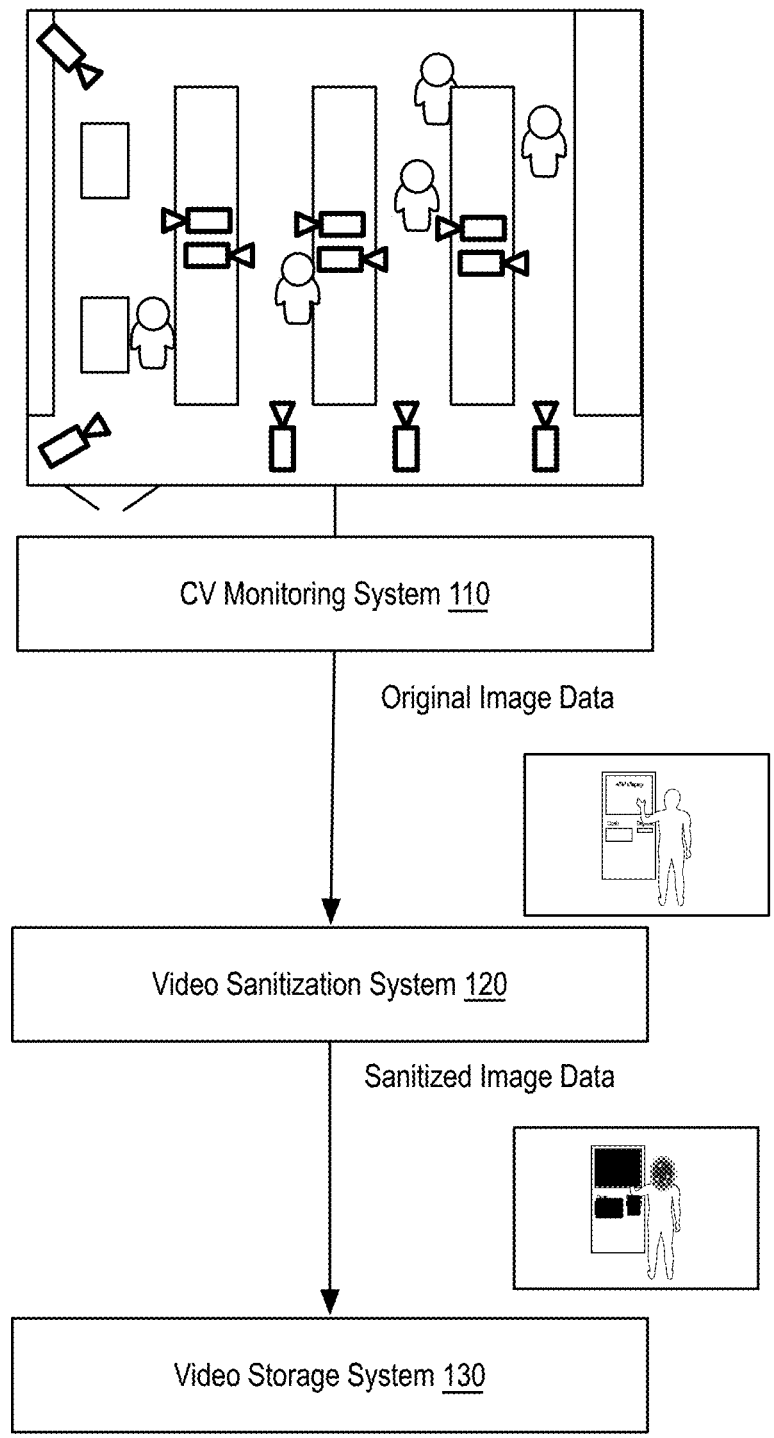
FIG. 1 is a schematic representation of a system of a preferred embodiment.

The following description of the embodiments of the invention is not intended to limit the invention to these embodiments but rather to enable a person skilled in the art to make and use this invention.

1. Overview

A system and method for automated privacy preservation functions to intelligently augment image data captured for computer vision applications in the interest of protecting and enhancing privacy. In some preferred variations, the system and method can be used in securing privacy of activity on personal devices and computing kiosks. For example, image data that happens to contain imagery showing the screen or user interactions with a phone or an ATM may be automatically redacted or obscured in the image data. Additional or alternative objects or activities could similarly be sanitized within image data. For example, documents, activity at a pharmacy counter, paper records, credit cards and identification cards, and/or any suitable activities can be sanitized.

The system and method can be particularly useful in computer vision (CV) based applications wherein there may be high density video monitoring and/or high-resolution image data. A CV-based application will generally make use of the image data with the objective of sensing and detecting various forms of information about the environment or activities in the environment. The CV-based application may additionally model the information to understand state and activity of the environment and objects in the environment. As one example, a CV-based application may be system for facilitating a form of automated checkout within a retail environment. The capture of other activity and content may be a byproduct of monitoring the environment. In some cases, it can be desirable to protect, secure, and/or remove details in the image data that are unrelated to or are no longer of use to the CV-based application. The system and method preferably provide various approaches to enable use of a CV monitoring system that preserves user anonymity and protects sensitive data. Such a system and method can have enormous benefits to users and can help operators of CV-based applications to isolate use of video surveillance to intended purposes. In this way the system and method can exclude image data irrelevant to the main objective of a CV monitoring system or image data that may introduce a liability or compliance issue.

The system and method are preferably used in image sanitization. Image sanitization, as used herein, characterizes any suitable changes to the image data. A primary example of image sanitization may include image redaction or blurring. The objective of image sanitization will generally be related to user privacy, financial security, regulatory compliance (e.g., maintaining Health Insurance Portability and Accountability Act (HIPPA) compliance in a medical care environment in the United States), and/or any suitable objective. Sanitization can involve fully or partially redacting, reducing resolution/fidelity, modifying, encrypting, and/ or applying other suitable modifications to portions or all relevant image data.

In general, the system and method is used in CV-based applications where the image data is collected in a public or community space. The system and method may be particularly useful in environments where some of the activity performed can visually expose information where there is an expectation and/or regulatory obligation to keep the information private. Examples of environments where the system and method may be particularly applicable can include retail stores, banks, hospitals, pharmacies, and/or other environments. However, the system and method can be useful more broadly in protecting privacy on demand. With the widespread use of mobile computing, sensitive information can be exposed in any environment. The system and method for example, may be used to secure image data that would have otherwise revealed authentication information of a user as the user logged in to an application or website on a phone.

A retail environment and more specifically a grocery store is used as an exemplary retail environment in the examples described herein. However, the system and method are not limited to retail or to grocery stores.

The system and method can preferably make use of one or several different approaches to automate detection of regions for sanitization. Variations that may be used can include application of object detection intelligence, detection of instructive sanitization markers, device detection and interpretation, and/or gesture and event intelligence. The various approaches may be applied in different contexts for precise control over sanitization.

The system and method may additionally or alternatively apply a form of spatial image sanitization. Spatial image sanitization can use spatial understanding of collected image data. One variety of spatial image sanitization can include volumetric image sanitization. Volumetric image sanitization characterizes an approach to image sanitization that interprets multi-dimensional position of an object or region being sanitized. Such an approach can translate the application of image data redaction and sanitization away from basic flat object recognition to actually redacting or altering image data based on a volumetric or spatial understanding of the image data. Spatial image sanitization may also be used in coordinating image sanitization across multiple imaging devices. Spatial image sanitization may additionally or alternatively translate the understanding of the scene between different imaging devices collecting image data of the overlapping region or sufficiently proximate regions in an environment. In many CV-based applications, imaging devices with distinct points of view will be used simultaneously. Volumetric image sanitization can be used in coordinating across imaging devices.

Additionally, the system and method can apply image sanitization in coordination with object-permanence. In this way, a sanitized object can maintain its protection as it is tracked through an environment despite the fact that the object may be occluded or change orientation. Application of image sanitization can also be performed forward and backwards in time. For example, in an exemplary implementation, a region of an environment may want to protect the identity of those that visit the pharmacy. The system and method may enable temporal transfer of redaction configuration for a tracked person, where previous and subsequent video data of an identified person is sanitized if the person enters the specified pharmacy region.

In one area of application, the system and method can be used in sanitizing image data of the use of ATM and/or other types of computing kiosks. Screens, device input, user identity can be protected.

In another area of application, the system and method can be used in sanitizing image data of personal computing devices and interactions with the devices. In general screens of devices like a smart phone can be automatically sanitized. This can be used to protect from visual inspection of communications, personal information entered in the device, and/or other forms of use of a personal device.

In another area of application, the system and method can be used in sanitizing image data in a health care setting where various physical and digital records can expose personal information. Paper records, prescription and medical equipment, user interface outputs of medical devices and/or other objects may be dynamically processed and sanitized from exposing undesired information. Temporal transfer of redaction configuration can similarly be used to sanitize image data of personal medical records. Within a hospital environment this may be used to keep satisfy data record compliance (e.g., HIPPA compliance). In one example, areas around a pharmacy counter, objects in that region, and/or people at the pharmacy may dynamically be subjected to image sanitization to preserve privacy.

In another area of application, the system and method may be used more generally in securing personal privacy. People captured in the image data could be anonymized. In some cases, they could be cryptographically anonymized such that appropriate parties may be able to determine an identifier, which may or may not be related to a personal identifier. Various user privacy tools may be enabled through such an approach while maintaining operability of CV-based applications.

The system and method may be applied in a variety of areas of application. As mentioned, the system and method can be particularly useful with systems where CV-based applications are used. In one preferred variation, the system and method can be applied to automated and/or semi-automated checkout systems.

Herein, automated and/or semi-automated checkout is primarily characterized by a system or method that generates or maintains a virtual cart (i.e., a checkout list) during the shopping experience with the objective of tracking the possessed or selected items for billing a customer. The checkout process can occur when a customer is in the process of leaving a store. The checkout process could alternatively occur when any suitable condition for completing a checkout process is satisfied such as when a customer selects a checkout option within an application.

A virtual cart may be maintained and tracked during a shopping experience. In performing an automated checkout process, the system and method can automatically charge an account of a customer for the total of a shopping cart and/or alternatively automatically present the total transaction for customer completion. Actual execution of a transaction may occur during or after the checkout process in the store. For example, a credit card may be billed after the customer leaves the store. Alternatively, single item or small batch transactions could be executed during the shopping experience. For example, automatic checkout transactions may occur for each item selection event. Checkout transactions may be processed by a checkout processing system through a stored payment mechanism, through an application, through a conventional PoS system, or in any suitable manner.

One variation of a fully automated checkout process may enable customers to select items for purchase (including produce and/or bulk goods) and then leave the store. The automated checkout system and method could automatically bill a customer for selected items in response to a customer leaving the shopping environment. The checkout list can be compiled using computer vision and/or additional monitoring systems. In a semi-automated checkout experience variation, a checkout list or virtual cart may be generated in part or whole for a customer. The act of completing a transaction may involve additional systems. For example, the virtual cart can be synchronized with (or otherwise transmitted to) a point of sale (POS) system manned by a worker so that at least a subset of items can be automatically entered into the POS system thereby alleviating manual entry of the items.

The system and method can preferably be used in securing video privacy along a number of different vectors. The system and method may be used in privatizing exposed usage of personal computing devices by customers and others in a store. For example, visually displayed information and interactions with a phone of a customer could be artificially obscured in the video. The system and method may additionally be used in privatizing use of ATMs, internal banking desks (e.g., banks inside of a grocery store), pharmacy counters, and the like.

As additional or alternative areas of use, the system and method can be used in CV-based applications for hospitals or other medical services. CV-based applications could be used for various operations, care services, security systems, health monitoring systems, and other suitable applications. In such environments, patient privacy can be extremely important. The system and method may be used to automate the privatization of sensitive information and activity, while enabling the CV-based application to be put to use.

While, the system and method may have uses alongside CV-based applications, the system and method could be used with any suitable video monitoring system including one used as part of a security system. The system and method may be particularly useful in places where video surveillance is valuable, but preservation of privacy is also of great importance such as in a bank.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As one potential benefit, the system and method can preserve the privacy of individuals observed in an environment. Information unintentionally exposed through personal computing devices, physical items (e.g., documents, physical credit cards, ID cards, and the like), personally sensitive objects (e.g., prescription bottles), and the like can be dynamically detected in secured.

Additionally, as another potential benefit, the system and method may more fully sanitize image data of privacy concerns by coordinating image data sanitization across multiple sources of image data. The understanding of the environment as viewed by multiple imaging devices can be used to intelligently apply image sanitization independent of each camera needing to individually identify an object or interpret a scene. Additionally, modeling of object-permanence and contextual understanding of the observed activity in the image data may be leveraged to appropriately apply image sanitization.

As another potential benefit, the system and method may serve to provide a faster on-boarding process. The system and method may automate a number of aspects related to configuring settings for image sanitization in a high volume video monitoring system. For example, the marking or detection of a number of ATMs in a store can quickly configure image privatization for a number of imaging devices with coverage of the ATMs.

As another potential benefit, the system and method can further enable improved privacy enforcement for mobile cameras. Augmented reality glasses or other variations of smart glasses and other suitable types of mobile cameras can use the system and method described herein to automatically collect image data that complies with privacy restrictions and/or preferences of individuals and institutions.

The system and method will generally be accompanied by numerous other benefits and the discussion of the benefits herein does not limit the system and method to necessarily include such benefits or to only include such benefits.

2. System

As shown in FIG. 1, a system for automatic privacy preservation can include a CV monitoring system 110, a video sanitization system 120, and a video storage system 130. The system is preferably implemented within a particular environment. Various forms of image sanitization may be applied within the environment. The system preferably includes a processing system configured to perform the method processes described herein.

A CV monitoring system 110 of a preferred embodiment functions to collect image data and facilitate one or more CV processes. Preferably, the CV monitoring system no is used for detecting objects, monitoring users (e.g., humans), tracking user-object interactions, and/or making other conclusions based on image and/or sensor data. The CV monitoring system no will preferably include various computing elements used in processing image data collected by an imaging system. In particular, the CV monitoring system no will preferably include an imaging system and a set of modeling processes and/or other processes to facilitate analysis of user actions, object state, and/or other properties of the environment.

The CV monitoring system no is a computer-implemented system that is configured to facilitate identifying of objects and detection of interactions associated with identified objects. The CV monitoring system no can include or be communicatively integrated with one or more computer processors and one or more computer-readable mediums storing instructions that, when executed by the one or more computer processors, cause the system to perform operations of the processes and methods described herein.

The CV monitoring system no preferably provides specific functionality that may be varied and customized for a variety of applications. In addition to object identification, the CV monitoring system no may additionally facilitate operations related to person identification, object interaction tracking, and/or other CV-based observations. Preferably, the CV monitoring system no can at least partially provide: person detection; person identification; person tracking; object detection; object classification; object tracking; gesture, event, or interaction detection; detection of a set of user-object interactions, and/or other forms of information.

In one preferred embodiment, the system can use a CV monitoring system 110 and processing system such as the one described in the published U.S. Patent Application No. 2017/0323376 filed on May 9, 2017, which is hereby incorporated in its entirety by this reference. The CV monitoring system no will preferably include various computing elements used in processing image data collected by an imaging system.

The imaging system functions to collect image data within the environment. The imaging system preferably includes a set of image capture devices. The imaging system might collect some combination of visual, infrared, depth-based, lidar, radar, sonar, and/or other types of image data. The imaging system is preferably positioned at a range of distinct vantage points. However, in one variation, the imaging system may include only a single image capture device. In one example, a small environment may only require a single camera to monitor a shelf of purchasable objects when used in an automated checkout application. The image data is preferably video but can alternatively be a set of periodic static images. In one implementation, the imaging system may collect image data from existing surveillance or video systems. The image capture devices may be permanently situated in fixed locations. Alternatively, some or all may be moved, panned, zoomed, or carried throughout the facility in order to acquire more varied perspective views.

In one variation, a subset of imaging devices can be mobile cameras (e.g., wearable cameras or cameras of personal computing devices). For example, in one implementation, the system could operate partially or entirely using personal imaging devices worn by users in the environment (e.g., workers or customers). In some variations, a mobile camera may make use of the spatial mapping of the environment and spatial configuration of sanitization regions to dynamically sanitize (e.g., redact) captured image based on the mobile device's understanding of the position and orientation of the device relative to the environment. Accordingly, a mobile camera may include an inertial measurement unit (e.g., accelerometers, gyroscope, magnetometer), a location detection system (e.g., GPS or Signal triangulation system, etc.), and/or other sensors to determine position and/or orientation. In one variation, the mobile camera can be a multi-camera device to facilitate creation of a depth map of the field of view and/or the environment. The captured image of a mobile camera may additionally be used to determine position and orientation within the environment.

The imaging system preferably includes a set of static image devices mounted with an aerial view from the ceiling or overhead. The aerial view imaging devices preferably provide image data that observes at least the users in locations where they would interact with objects. Preferably, the image data includes images of the objects and users (e.g., customers or workers). While the system (and method) are described herein as they would be used to perform CV as it relates to a particular object and/or user, the system and method can preferably perform such functionality in parallel across multiple users and multiple locations in the environment. Therefore, the image data may collect image data that captures multiple objects with simultaneous overlapping events. The imaging system is preferably installed such that the image data covers the area of interest within the environment.

Herein, ubiquitous monitoring (or more specifically ubiquitous video monitoring) characterizes pervasive sensor monitoring across regions of interest in an environment. Ubiquitous monitoring will generally have a large coverage area that is preferably substantially continuous across the monitored portion of the environment. However, discontinuities of a region may be supported. Additionally, monitoring may monitor with a substantially uniform data resolution or at least with a resolution above a set threshold. In some variations, a CV monitoring system no may have an imaging system with only partial coverage within the environment.

A CV-based processing engine and data pipeline preferably manages the collected image data and facilitates processing of the image data to establish various conclusions. The various CV-based processing modules are preferably used in generating user-object interaction events, a recorded history of user actions and behavior, and/or collecting other information within the environment. The data processing engine can reside local to the imaging system or capture devices and/or an environment. The data processing engine may alternatively operate remotely in part or whole in a cloud-based computing platform.

The object detection module of a preferred embodiment, functions to detect and apply an identifier to an object. The object detection module preferably performs a combination of object detection, segmentation, classification, and/or identification. This is preferably used in identifying products or objects displayed in a store. Preferably, a product can be classified and associated with a product SKU identifier. In some cases, a product may be classified as a general type of product. For example, a carton of milk may be labeled as milk without specifically identifying the SKU of that particular carton of milk. An object tracking module could similarly be used to track objects through the store. Object detection could be used in detecting objects associated with potential image privatization such as by classifying objects such as an ATM machine, a credit card, an ID card, a medication bottle, a personal computing device (e.g., phone, smart watch, etc.).

User-object interaction processing modules function to detect or classify scenarios of users interacting with an object (or performing some gesture interaction in general). User-object interaction processing modules may be configured to detect particular interactions through other processing modules. For example, tracking the relative position of a user and object can be used to trigger events when a user is in proximity to an object but then starts to move away. Specialized user-object interaction processing modules may classify particular interactions such as interacting with a computer kiosk (e.g., an ATM) or using a personal computer device. User-object interaction detection may be used as one potential input into conditional sanitization.

A person detection and/or tracking module functions to detect people and track them through the environment. The person detection and tracking can track a person within the field of view of the camera. The person detection and tracking may additionally or alternatively track a person across different cameras.

A person identification module can be a similar module that may be used to detect the presence of an unidentified person or uniquely identify a person. Individual identification may use biometric identification. Alternatively, the person identification module may use Bluetooth beaconing, computing device signature detection, computing device location tracking, and/or other techniques to facilitate the identification of a person. Identifying a person preferably enable customer history, settings, and preferences to be associated with a person. A person identification module may additionally be used in detecting an associated user record or account. Image sanitization may be applied to obscure subsequent CV identification of a user and/or human identification of a user, while preserving internal identifying of the user for sole purposes of an application. This may be used to prevent personal tracking to be used outside of the intended application.

A gesture, event, or interaction detection modules function to detect various scenarios involving a customer. One preferred type of interaction detection could be a user attention tracking module that functions to detect and interpret user attention. This is preferably used to detect if, and optionally where, a user directs attention. This can be used to detect if a user is looking in the direction of an object such as a smart phone or an ATM machine.

The system may additionally include a spatial detection or imaging system that uses sensors and/or image data of the CV monitoring system 110 to determine a depth map of the environment. In particular, the depth map is of the region viewed in the image data. The spatial detection system may additionally form an at least partial depth map of the environment by stitching or matching multiple depth maps together.

Related to the spatial detection/imaging system, the system may additionally include an imaging device mapping system that functions to determine the relative orientation and coverage of multiple imaging devices. The imaging device mapping system includes and manages a model the field of view of an imaging device and how that overlaps with one or more fields of view of other imaging devices. The imaging device mapping system can include imaging device position information that is manually configured, semi-automatically configured, or automatically configured. For example, the imaging device mapping system may allow approximate positioning of cameras in an environment to be configured. The positioning information may include 2D location, 3D location, direction, orientation, field of view variables, and/or other factors. The positioning information may be positioning in a 2D map of the environment along with direction information. The positioning information may in another example be position in 3D space along with orientation along three rotational axes. The imaging device mapping system may additionally include modeling of the environment, which may be manually configured (e.g., setting where walls and static fixtures of the environment are located) or automatically detected through monitoring of the environment. The modeled field of view of the cameras may be used to translate image sanitization objectives between cameras with different views of a scene.

The video sanitization system 120 of a preferred embodiment functions to perform automated sanitization of image data in video to augment the visually present information. The video sanitization system 120 is preferably configured to detect select regions within the collected image data and appropriately apply a form of image sanitization to the select region. Forms of image sanitization can include redaction (e.g., writing over the image data, "blacking out"), reducing information density (e.g., blurring), altering machine interpreted signals in the image data modifying (e.g., replacing image data with alternative representation), encoding, and/or other modifications of the image data.

The video sanitization system 120 uses CV-based processing of the image data in determination of a region for image sanitization. Alternatively, user or external input may be used in at least partially determining a sanitization region.

The video sanitization system 120 may include a configuration system, which functions to set the configuration of sanitization regions for the system. There may be a variety of ways in which a sanitization region can be configured. In a first variation, a sanitization region may be manually configured wherein a region or object is specified within the image data of at least one imaging device. In a second variation, a sanitization region can be configured to be automatically generated in response to detection of an object, event, or other CV detected condition in the environment. For example, a sanitization region can be configured to be generated for any detected personal computing device screen. Various options for the conditions for sanitization, how sanitization is applied, and/or other suitable options can be set.

The video sanitization system 120 additionally includes configuration to monitor the image data according to the image sanitization configuration. This may include monitoring the resulting modeling of the image data for conditions that may trigger some action according to the image sanitization configuration. The video sanitization system 120 may additionally or alternatively evaluate generated information from the image data to determine sanitization regions and the corresponding pixel or image regions for sanitization.

The video sanitization system 120 once a region for sanitization is determined and initiated, the image data is preferably transformed and updated within the video storage system 130.

In one variation, the video sanitization system 120 can receive image data from the CV monitoring system no. In this variation, the sanitized image data output from the video sanitization system 120 can be stored in the video storage system 130 or output to any suitable system. In another variation, the video sanitization system 120 can receive and operate on image data from the video storage system 130. In this variation, an original representation of the image data can be preserved but sanitized image data can be served and used for other purposes.

The video storage system 130 of a preferred embodiment functions to store the video data. As discussed with the video sanitization system 120, video sanitization in one variation can be applied post-capture and pre-storage. In another variation, video sanitization can be applied upon video access request, which may be applied to stored video. In some instances, it may be useful for the application of the video to store unmodified video. Dynamic sanitization may be applied when the video is accessed by a client (e.g., a human or another computing system). In some instances, the nature of the sanitization can vary depending on the client accessing the video.

3. Method

Figure 3:
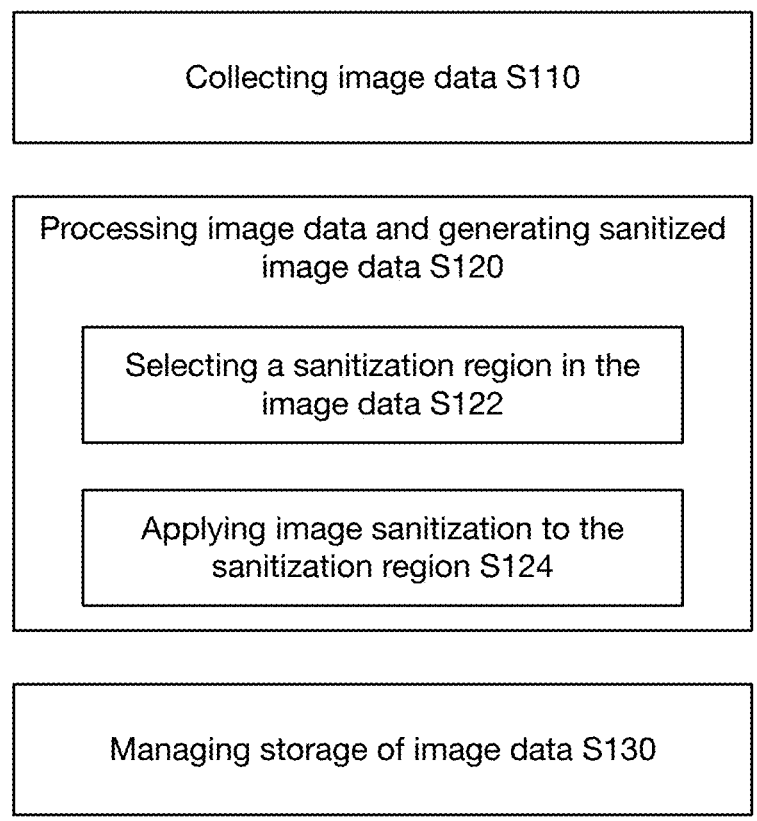
FIG. 3 is a flowchart representation of a method of a preferred embodiment.
Figure 14:
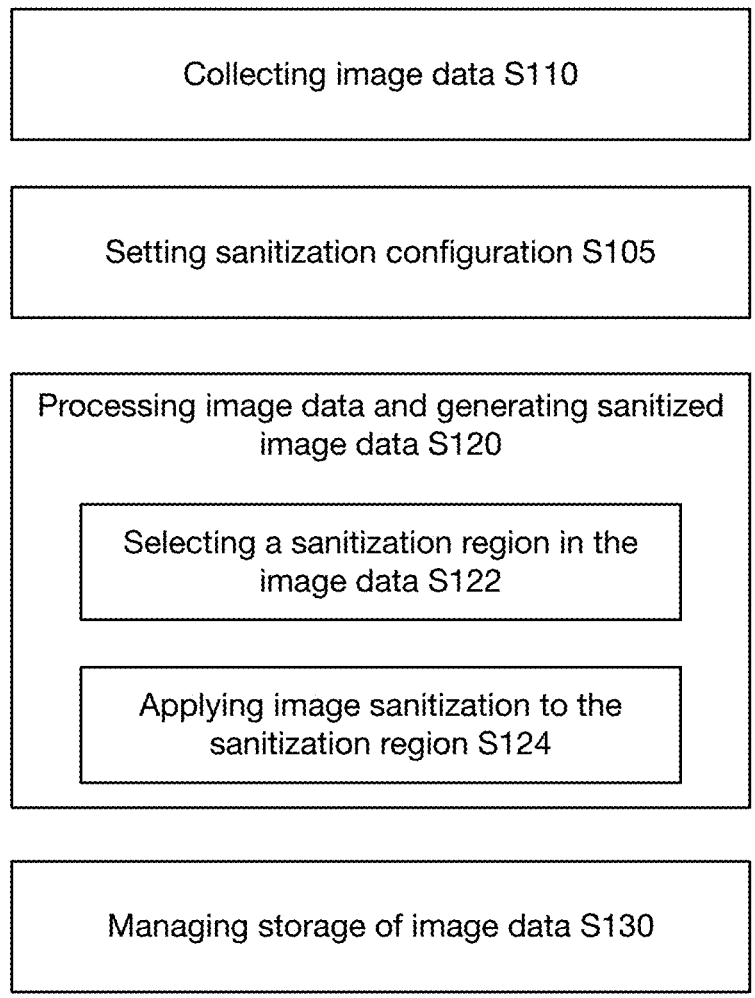
FIGS. 14-16 are flow diagrams of exemplary variations of the method.

As shown in FIG. 3, a method S100 for automatic privacy preservation can include collecting image data S110; processing image data and thereby generating sanitized image data S120, which includes selecting a sanitization region in the image data S122 and applying image sanitization to the sanitization region S124; and managing storage of image data S130. In some variations, the method includes setting sanitization configuration S105, wherein the sanitization region is selected according to the sanitization configuration as shown in FIG. 14.

Figure 15:
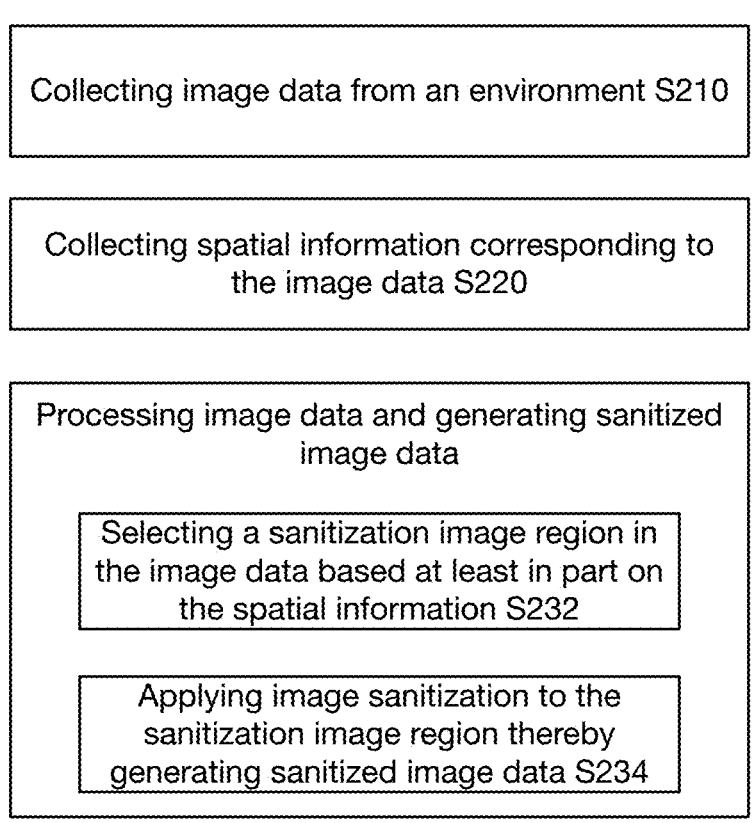

In one preferred variation, the method is adapted to use a form of spatial image sanitization wherein a method for automatic privacy preservation using spatial understanding of the image data can include collecting image data from an environment S210; collecting spatial information corresponding to the image data S220; selecting a sanitization image region in the image data based at least in part on the spatial information S232; and applying image sanitization to the sanitization image region thereby generating sanitized image data S234 as shown in FIG. 15. The processes of this method can be similar to those of method S100 and include any of variations described herein.

Figure 16:
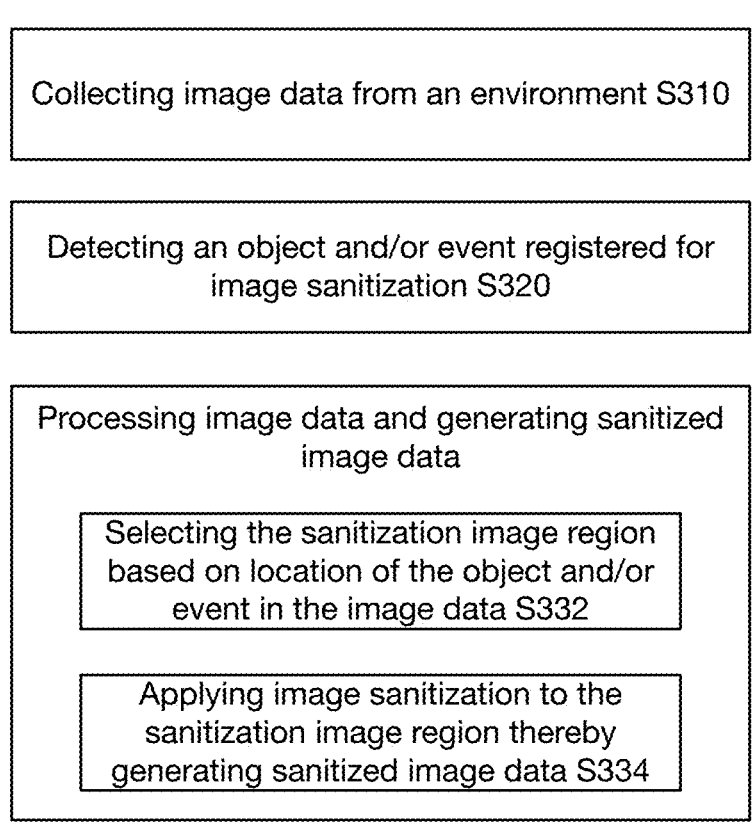

In another variation, the method may be adapted to use a form of conditional image sanitization, wherein a method for automatic privacy preservation using CV-based interpretation of the environment can include collecting image data from an environment S310; detecting an object and or event registered for image sanitization S320; selecting the sanitization image region based on location of the object and/or event in the image data S332; applying image sanitization to the sanitization image region thereby generating sanitized image data S334 as shown in FIG. 16. The processes of this method can be similar to those of method S100 and include any of variations described herein.

The conditional sanitization variation and the spatial image sanitization may be implemented independently but may also be used in combination depending on the implementation.

The method is preferably implemented by a system described herein, where the system comprises of a processing system with machine readable instructions configured to implement the method for automatic privacy preservation. The method may alternatively be implemented by any suitable computer or processing system.

The method may include several variations, which may include variations related to configuring and customizing image sanitization for a particular environment, altering how a sanitization region is determined within the image data, and/or using different techniques for modifying and sanitizing the image data. These variations may be used in combination or independently.

Block S110, which includes collecting image data, functions to collect video, pictures, or other imagery of an environment. The image data is preferably captured over a region expected to contain objects of interest (e.g., inventory items in a store, the storefront of a bank, a hospital floor, etc.) and interactions with such objects. Image data is preferably collected from across the environment from a set of multiple imaging devices. Preferably, collecting image data occurs from a variety of capture points (e.g., different imaging devices). In a multicamera variation, collecting image data can include collecting multiple sets of image data from different imaging devices that preferably capture distinct fields of view within the environment. The set of capture points can include overlapping and/or non-overlapping views of monitored regions in an environment. Alternatively, the method may utilize a single imaging device, where the imaging device has sufficient view of a selected area. The image data may substantially cover a continuous region in an environment. However, the method can accommodate for holes, gaps, or uninspected regions. In particular, the method may be robust for handling areas with an absence of image-based surveillance such as bathrooms, hallways, and the like.

The image data may be directly collected, wherein collecting image data can include sensing image data from an imaging system and communicating the image data to an appropriate processing system for image sanitization processing. The image data may be of a single format, but the image data may alternatively include a set of different image data formats. The image data can include high resolution video, low resolution video, photographs from distinct points in time, image data from a fixed point of view, image data from an actuating camera, visual spectrum image data, infrared image data, 3D depth sensing image data, parallax, lidar, radar, sonar, passive illumination, active illumination, and/or any suitable type of image data.

The image data may alternatively be indirectly collected wherein collecting image data includes receiving image data record by an external imaging system. In this variation, the method may not include the actual sensing of the image data, but facilitates the management and processing of the image data for the purposes of image sanitization.

The method may be used with a variety of imaging systems, collecting image data may additionally include collecting image data from a set of imaging devices set in at least one of a set of configurations. The imaging device configurations can include: aerial capture configuration, shelf-directed capture configuration, movable configuration, and/or other types of imaging device configurations. Imaging devices mounted over-head are preferably in an aerial capture configuration and are preferably used as a main image data source. In some variations, particular sections of the store may have one or more dedicated imaging devices directed at a particular region or product so as to deliver content specifically for interactions in that region.

In some variations, imaging devices may include worn imaging devices such as a smart eyewear imaging device. This alternative movable configuration can be similarly used to extract information of the individual wearing the imaging device or other observed in the collected image data.

These different variations of collecting image data may be used for all image data processing within the method. For example, an array of over-head cameras may collect image data used in configuring image sanitization, detecting a condition for image sanitization, and be the image data that receives image sanitization. In some variations, various subsets of image data may be collected for different portions of the method. Different sources may collect image data used for configuring image sanitization, detecting a condition for image sanitization, and receiving image sanitization. In one example, over-heard cameras may be used for configuring image sanitization and/or detecting a condition for image sanitization, but the image data collected by a mobile device may be the image data that is sanitized.

Block S105, which includes setting sanitization configuration, functions to establish the way in which sanitization is applied to the image data. The way in which image sanitization is applied may alter the setting of sanitization configuration.

There may be multiple instances of sanitization configuration for different locations, objects, or other conditions. For example, image sanitization may be defined for a pre-defined region of an environment as well as for any mobile devices or paper documents detected in the environment.

In some implementations, the method may include setting sanitization configuration for each new environment as a way of initializing a CV monitoring system for implementing the image sanitization. For example, a number of regions in the environment may be configured for image sanitization. In a CV monitoring system within a retail environment, there may be various scenarios in which image sanitization may be configured. For example, an ATM machine, a bank counter, and a pharmacy may each individually be setup with sanitization configurations. Additionally, one may configure any instances where a customer is interacting with a personal computing device to be sanitized.

In other implementations, image sanitization may be pre-configured by default wherein the rules and logic for image sanitization is independent of the particular environment. For example, image sanitization may be pre-configured within the machine-readable instructions of an implementing computer system so as to automatically detect particular conditions and apply image sanitization in a designated manner.

As will be described below, image sanitization can be associated with a particular region in the environment and/or a detected object or event in the environment.

Setting sanitization configuration for a particular region may include setting a reference sanitization region. More specifically this can be a reference sanitization spatial region. This may function to establish sanitization configuration defining image sanitization relative to a substantially pre-defined and stationary location. An image sanitization region can be a point, line or path, a 2D surface or plane, or a 3D volume. This reference region (i.e., reference sanitization spatial region) can be used to determine how regions of the image data will be selected for image sanitization. Various rules for how image sanitization are applied for this sanitization region can be included in the configuration.

Setting a reference region may be preconfigured and set manually. In a manual configuration variation, setting sanitization configuration includes receiving sanitization configuration from a user interface. Manual configuration may include receiving specification of the reference region by marking of a 2D region of image data. For example, a user interface may provide an option to draw a bounding box, mark a point, or draw some shape that defines an image sanitization region. This 2D region marking the image data may be translated to a spatial sanitization region by translating the marked 2D image areas (e.g., pixels) to a location in a depth map. The depth map is preferably aligned to the visual image data.

Setting sanitization configuration for a particular region may alternatively include setting a reference region or more directly a sanitization image region conditional on computer vision detected information (i.e., information generated by processing the image data using one or more computer vision processes). This variation of sanitization configuration can make image sanitization dependent on the detection of an object/objects, event/events, and/or relationships of the objects and/or events. For example, sanitization configuration may be set for detecting mobile device screens such that the configuration specifies parameters defining how image sanitization is used in response to detecting a mobile device screen.

Manual or preconfigured settings may associate various rules for image sanitization to the detection of different CV-detected conditions.

In one variation, setting sanitization configuration includes setting sanitization configuration conditional on the detection of an object type. Exemplary object types can include a computer kiosk, an ATM machine, smart phone (e.g., smart phone screen), paper documents, a computer monitor, a cash register, a medical computing device, a stocking shelf, a paper document, and/or other suitable types of objects. Sanitization configuration may also be conditional on properties of a detected object. For example, sanitization configuration may be set for an ATM machine showing a user interface for personalized customer interaction (e.g., not a screensaver/marketing image).

In another variation, setting sanitization configuration includes setting sanitization configuration conditional on detected events in the environment. Exemplary event types may include user typing at a keyboard, user interacting with a computing device, user showing personal identifying information, user changing clothes, user preparing for medical examination, and/or other activities related to when preserving privacy and sanitizing image data is desired.

In another variation, setting sanitization configuration includes setting sanitization configuration conditional on detection of an object in combination with an event. This condition may require detection of the presence of a type of object and the occurrence of a detected event.

In another variation, setting sanitization configuration includes setting sanitization configuration conditional on detection of two objects having some interaction. For example, this may include detecting a person looking, interacting with, or performing some other action with an ATM.

In another variation, setting sanitization configuration includes setting sanitization configuration conditional on detection of two objects with some alternative relationship. This may include conditions based on object proximity, object contact, changes in relative object positions, and/or any other conditions.

In another variation, setting sanitization configuration includes setting sanitization configuration conditional on detection of a sanitization marker. A marker can be a graphical identifier that is used to indicate an object or region for sanitization. In some variations, multiple markers may define a particular reference region, sanitization region. The identity of a marker may additionally define aspects of the sanitization configuration. In one variation, markers and their associated encoded information can define sanitization configuration. In one example, an operator of a CV monitoring system may setup image sanitization by placing various sanitization marker stickers to different objects where video redaction should be dynamically applied. The method detects and appropriately interprets how to perform image sanitization depending on the stickers. In another variation, sanitization markers may be associated with specific sanitization configuration settings in this way the method may include detecting an identifier and then accessing and using the sanitization configuration of the identifier during process S120.

There may be various options set when setting sanitization configuration.

In one variation of a sanitization option, setting sanitization configuration may include setting spatial sanitization options. For example, options may be set for where image sanitization is applied relative to a determined sanitization region such as: sanitizing image data spatially positioned behind the sanitization region, sanitizing image data spatially positioned in front of the sanitization region, sanitizing image data spatially positioned within or intersecting the sanitization region, sanitizing image data spatially positioned within some distance threshold, and/or sanitizing image data according any suitable rule.

In another variation of a sanitization option, setting sanitization configuration may include setting coordination of image sanitization between cameras. There may be an option that enables sanitization regions as determined through the image data of one imaging device to be used in applying image sanitization of image data from another imaging device. This may be used to automatically apply image sanitization to image data from static cameras with a different but overlapping view of a sanitization region or objects identified for sanitization. This option may also be used to enable image redaction or sanitization to image data captured by mobile cameras when they view a designated region or object.

In another variation of a sanitization option, setting sanitization configuration may include setting forward or backward application of sanitized objects. There may be an option in the sanitization configuration to enable an object that is a subject of image sanitization to be tracked within the image data (and optionally across different imaging devices) and sanitized. This can be retroactive so that earlier image data is processed as well as future image data. For example, a user that is detected at a pharmacy counter may have identifying features (e.g., their face) blurred from earlier image data showing them entering the building and approaching the pharmacy counter and image data showing them leaving the building.

In another variation of a sanitization option, setting sanitization configuration may include setting the type of image sanitization. As described herein, there may be different forms of image sanitization. The type of redaction may be customized for different conditions and situations.

Block S120, which includes processing image data and thereby generating sanitized image data, functions to modify at least some sub-regions of image data. Processing image data will preferably include determination of when and how to sanitize the image data. The generating sanitized image data preferably includes transforming the image data or generating a new set of image data by redacting, encrypting, reducing resolution/fidelity, modifying and/or applying other suitable modifications to the input image data.

Processing of image data is preferably applied across the all image data. However, in some variations, image sanitization may be limited to a subset of image data collected in an environment. For example, in a store with an ATM, only image data from an imaging device with the ATM in the field of view may undergo processing for image sanitization. In other variations, all image data may be processed to initially determine if a form of image sanitization is relevant. Detection of image sanitization conditions may be evaluated continuously (e.g., for all frames of a video). Alternatively, periodic checks may be performed and if a sanitization condition is detected or possible, related image data may be processed. A sanitization condition may be based on other CV-based modeling. For example, image data of a scene with no people present may not be processed for image sanitization, but periodic checks may commence when a person is detected in the scene. Processing of image data and the evaluation of different conditions is preferably performed according to sanitization configuration set for the environment.

Processing image data and generating sanitized image data preferably includes selecting a sanitization region in the image data S122 and applying image sanitization to the sanitization region S124.

Block S122, which includes selecting a sanitization region in the image data, functions to locate objects and activity that can be subject to sanitization. Selection of a sanitization region may be based on the presence of one or more objects, the occurrence of one or more event, configuration for a particular location, and/or other suitable conditions. Selecting a sanitization region could be performed automatically and/or through external input. Selecting a sanitization region may include automatically detecting the sanitization region through computer vision analysis of image data. In another variation, selecting a sanitization region may include receiving user input and determining the sanitization region from the user input specifying an environment location. The selection of a sanitization region may be based on the sanitization configuration set above.

In some variations, selecting a sanitization region may directly identify portions of the image data for image sanitization. The portions of the image data for image sanitization may be referred to as a sanitization image region (e.g., what pixels are subjected to image sanitization).

In some variations, the selecting a sanitization region may include detecting an object or activity, setting a reference sanitization spatial region relative to the detected object/activity, and then determining a sanitization image region according to the reference sanitization spatial region.

In variations, where reference sanitization spatial regions are pre-configured through process S105 or otherwise, then selecting the sanitization region may include determining sanitization image region according to a configured reference sanitization spatial region.

As discussed in more detail, there may be several alternative approaches and conditions that can be used individually or in combination for the objective of determining where to apply image redaction.

Automatically detecting the sanitization region through computer vision analysis of image data, functions to use CV to automatically respond to the image data. Detecting a sanitization region may be performed in response to detecting an object and/or detecting an object-associated activity.

Detecting an object may include detecting an object registered for some form of image sanitization. Detecting an object preferably includes processing image data using one or more computer vision processes. Accordingly, detecting an object may include applying an object classification model, applying an object detection model, performing image segmentation or instance segmentation by applying a segmentation model, and/or other suitable processing approaches. Detecting an object preferably determines the type of object or detects a match to a type of object that is configured for image sanitization. Detecting an object can additionally identify the region in the image data associated with this, which may be a bounding box or an object-conforming mask (e.g., a pixel-wise mask) identifying the pixel data associated with an object. When the image data includes depth information or maps to a depth map, then the mask may also provide spatial information on the location of an object. Objects are preferably detected by identifying individual instances of an object.

In one variation, one or more types of devices may be registered for image sanitization. ATM machines, computer kiosks smart phones, smart watches, other personal computing devices, documents, medical devices, prescription bottles or bags, and/or other objects that may expose private information may be detectable objects configured for image sanitization. In another variation, objects such as a human face/head, or a prescription bottles, and/or paper documents may be monitored and used to trigger image sanitization.

Detecting a device with a display may include detecting electronic display presence, which may be performed through luminescence detection, discrete display changes of an object, displayed user interface detection, and/or other suitable approaches. Content of a display may additionally be classified and used in assigning a sanitization region around the screen. For example, this may include detecting an authentication screen and engaging image sanitization to prevent capture of information related to authentication credentials.

Object detection, and its associated object localized segmentation and classification, may also be performed for other objects in the environment. In particular objects that may factor into the image sanitization can be detected. For example, people detection and instance segmentation may be used to evaluate image sanitization conditions that are based on people. For example, image sanitization of an ATM may be enabled when a person is within some proximity and directs their attention towards the ATM.

Figure 2:
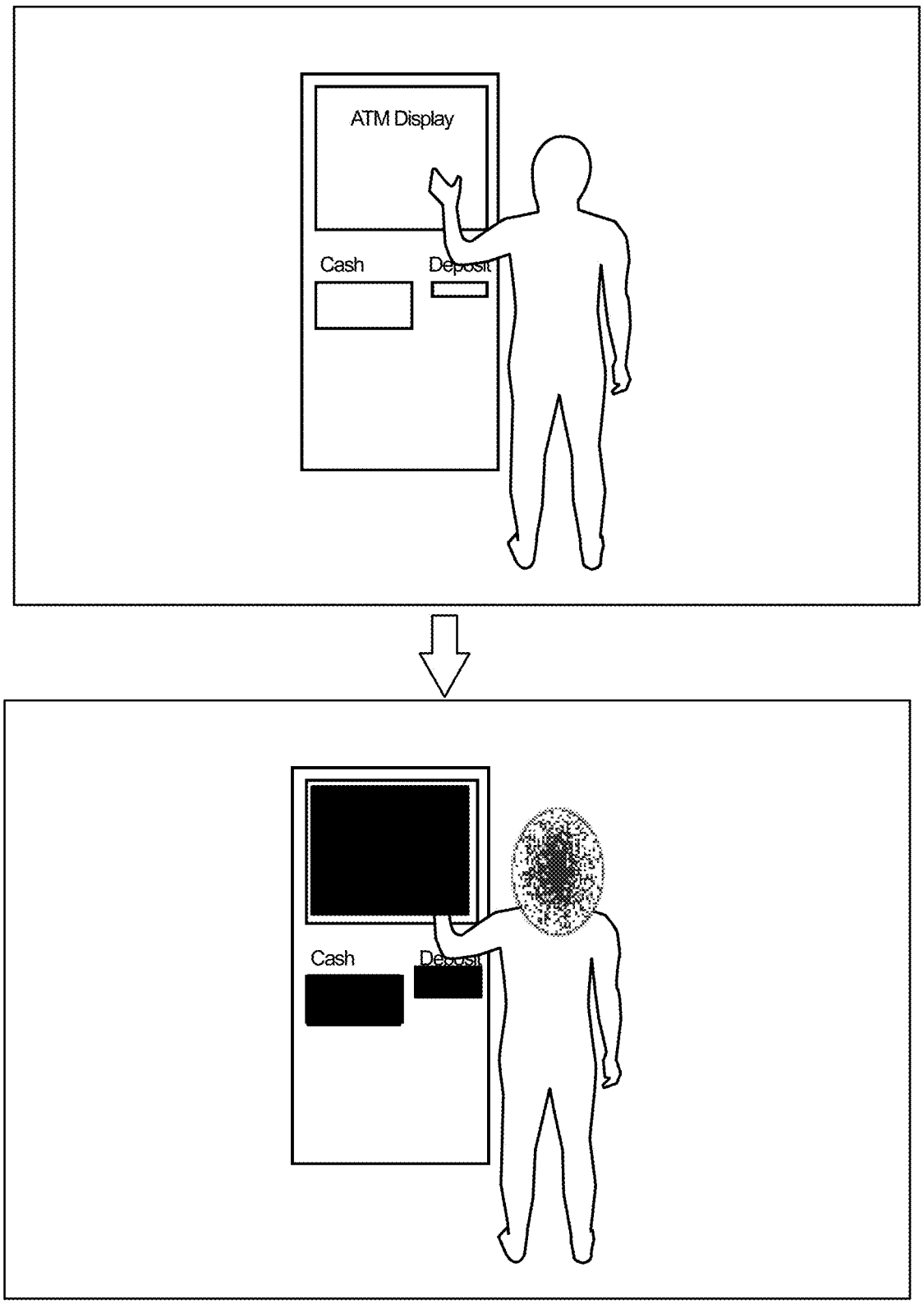
FIG. 2 is a graphical representation of image sanitization of the system and method used to preserve user privacy in an exemplary scenario.

Assigning of the sanitization region may be prompted in response to detecting a suitable object. In some variations, the sanitization region is applied to the detected object. In some variations, the sanitization region is applied to a sub-portion of the detected object. For example, detection of an ATM can prompt specification of a sanitization region relative to the display, cash delivery tray, document/cash deposit input, and the user input elements as shown in FIG. 2.

Detecting a sanitization region may in some variations depend on satisfaction of a number of different conditions. For example, the occurrence of detecting an ATM may need to be accompanied by detecting a human present with attention directed at the ATM, prior to satisfying a sanitization condition.

In one variation detecting a sanitization region includes detecting object-associated activity and determining a sanitization region according to the object-associated activity, which functions to detect patterns of a particular scenario and/or an action. As the use of a device may be context for providing privacy, detecting object-associated activity could include detecting human interaction with an object and selecting a sanitization region relative to the object and/or the human. Accordingly, this variation may more specifically be implemented by detecting person-object interaction and setting the sanitization image region according to the person object interaction. Detecting an object-associated activity or a person-object interaction preferably involves detecting the interaction by processing the image data using one or more CV-based processes. For example, detecting human interaction with an ATM, as shown in FIG. 2, may trigger selection of device-associated regions of the ATM and body-associated regions of the human so as to secure the input/output elements of the ATM device and the actions of the human interacting with the ATM. This could similarly be applied to smart phone use. For example, detecting hand/touch input gestures of a user may be used in determining a computing device is present and sanitizing image data in proximity to the detected gesture. A sanitization region may alternatively be determined in this variation, by assigning some sanitization region based on the location of the object-associated activity. For example, setting a volume for image sanitization based on an assigned location of the object-associated activity (e.g., the centroid for the activity or a bounding volume for the activity).

Figure 12:
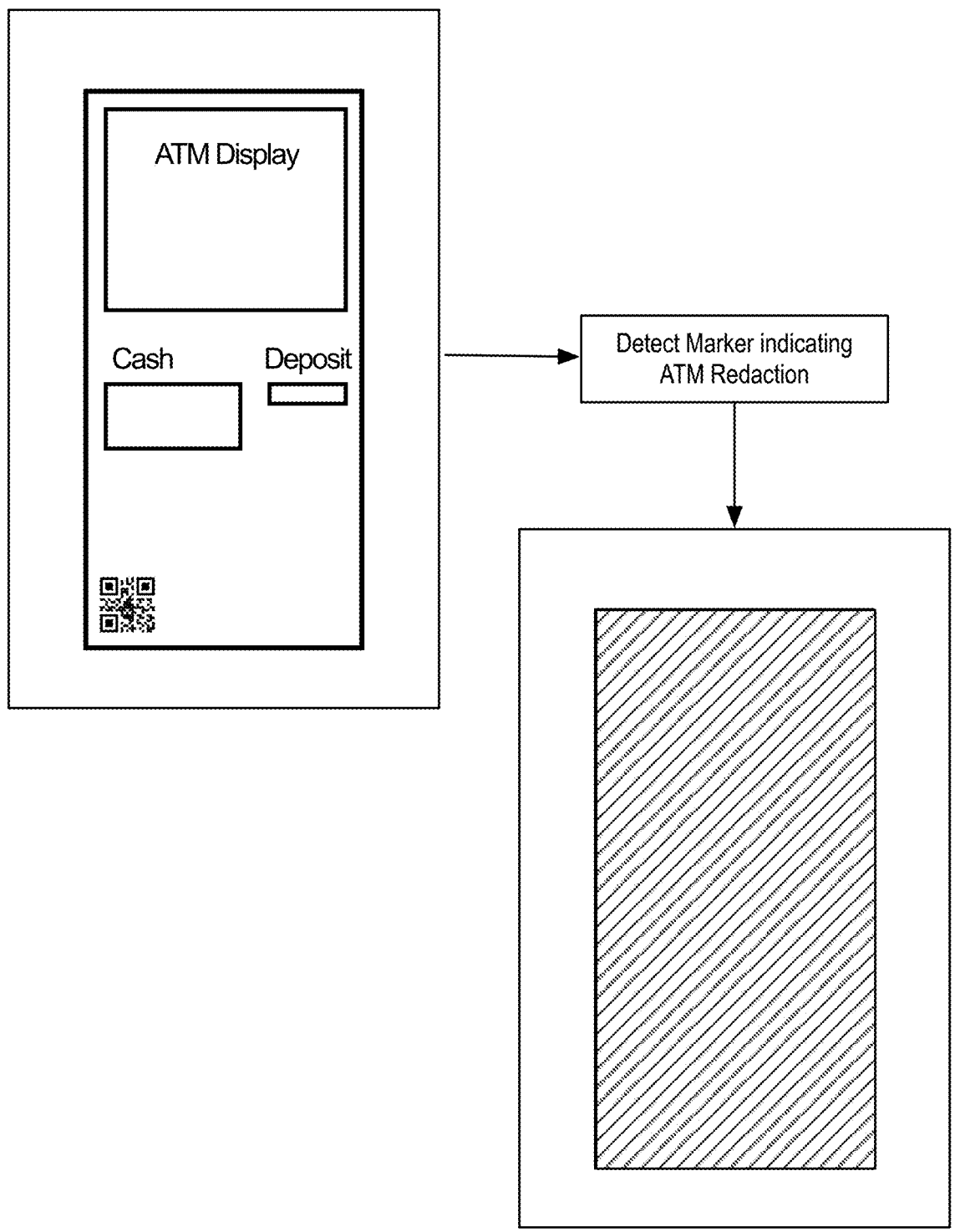
FIG. 12 is a schematic representation of using a sanitization marker.

In another variation, selecting the sanitization image region can include detecting one or more sanitization markers in the image data and positioning the sanitization image region according to the one or more sanitization markers as shown in FIG. 12. A sanitization marker is preferably a visual marker that is used to at least partially define a sanitization region. A sanitization marker could be a graphical sticker or decal that could be positioned in areas where privacy. In one variation, the graphical sticker has high contrast graphics to be more readably detected through CV monitoring. In one implementation, the graphical sticker is a machine-readable code with detectable orientation such as a QR code or other types of graphical codes like Aztex Codes, BEEtags, Bokodes, Code 1 codes, cryptograms, dataglyphs, data matrixes, DotCodes, high capacity color barcodes, MaxiCodes, JAB-Codes, and/or any suitable type of machine-readable graphical codes. Alternatively, the marker may be a detectable graphic wherein a CV model is trained on detecting the marker.

The sanitization marker may be used to define the location and/or space of the sanitization region. The sanitization marker may also be used to define the type or form of applied image sanitization such as the image data should be redacted, blurred, encrypted, applied to heads of users interacting with the object, dimensions of the sanitization region, geometry of the sanitization region, and/or other properties of applying image sanitization. The sanitization markers may alternatively be used to configure and set a reference region used to calculate sanitization image region in the image data.

In one variation, a sanitization marker is applied to an object. Detection of the sanitization marker is used to appropriately apply image sanitization to that object. In one example, a user may wear a badge where the badge visually directs a CV monitoring system to permit or prohibit various forms image usage. This may be used in directing a form of image sanitization for the wearer of the badge.

In another variation, a set of sanitization markers is applied in multiple locations in the physical environment to define a regional perimeter. The sanitization markers may be used to mark a two-dimensional space or a three-dimensional space. For example, a number of sanitization markers may be placed around the perimeter of a pharmacy help desk in a grocery store. This may be used to obscure image data beyond the defined perimeter thereby protecting privacy of those using the pharmacy.

Receiving user input and determining the sanitization region from the user input specifying an environment location, functions to use external inputs in at least partially determining a sanitization region. In one variation, during configuration of a CV monitoring system in an environment, a system administer could specify a set of locations where there should be a sanitization region. For example, an administrator could, through a user interface, mark several ATM machines captured by a new CV monitoring system. This may be performed through setting sanitization configuration S105.

Receiving user input may alternatively be performed in real-time with live image data. In one variation, a user may click an object, draw or define a shape or form, and/or manually enter parameters of a sanitization region. In another variation, an object includes a location sensor such that the location of the object can be communicated/announced and that can be used in determining a sanitization region. Object recognition and object segmentation may additionally be applied in partially automating the creation of a sanitization region from user input. As discussed below, marking of an object in image data from one imaging device can be translated to image data of other imaging devices. For example, an administrator marking an ATM visible from one camera may trigger: automatically determining the space for image sanitization for that camera; and translating the marked location to other spaces for image sanitization for at least a second camera.

Selecting the sanitization region S122 preferably involves determining specific areas in the image data in which to apply image sanitization during process S124. Different approaches may be used in setting the sanitization region including applying a mask, using object segmentation, selecting image data based on spatial position relative to a reference sanitization region, and/or other techniques.

In one basic variation, selecting the sanitization region S122 includes applying a mask to the image data in selecting sub-regions of the image data in which to apply video redaction.

In one variation, selecting the sanitization region S122 includes determining an image area based on object segmentation and selecting the image area as the sanitization region. This may include applying an object instance segmentation model but may alternatively be a bounding box generated from basic object detection. This object selected may in many implementations be the object that triggers image sanitization. For example, detection of an ATM machine may trigger selection of the image areas in the image data that correspond to the ATM machine.

Particular sub-regions of the object may alternatively be selected so that parts of the object are not sanitized while other portions are. For example, the screen, card reader, and the money tray of an ATM may be masked and selected for image sanitization.

In some variations, selecting the sanitization region S122 may incorporate spatial interpretation of the image data. Accordingly, selecting sanitization region S122 can include spatially selecting portions of the image data. Spatial selection is preferably based on an initial reference sanitization spatial region (or reference region). The reference region will preferably be a volume, 2D form, a plane, a point, and/or any suitable combination of spatial definition. The reference region will preferably include a spatial position. For example, a reference sanitization region may define a 2D marked area surface in 3D space.

Using spatial interpretation of the image data can facilitate preserving image information where it is not sensitive. In general, spatial selection of image data will initially define a reference sanitization region and use this to select image data based on the reference sanitization region. Spatial interpretation may be based on a statically defined reference region or a dynamically generated one such as one that is mapped to a detected object.

Figure 4A:
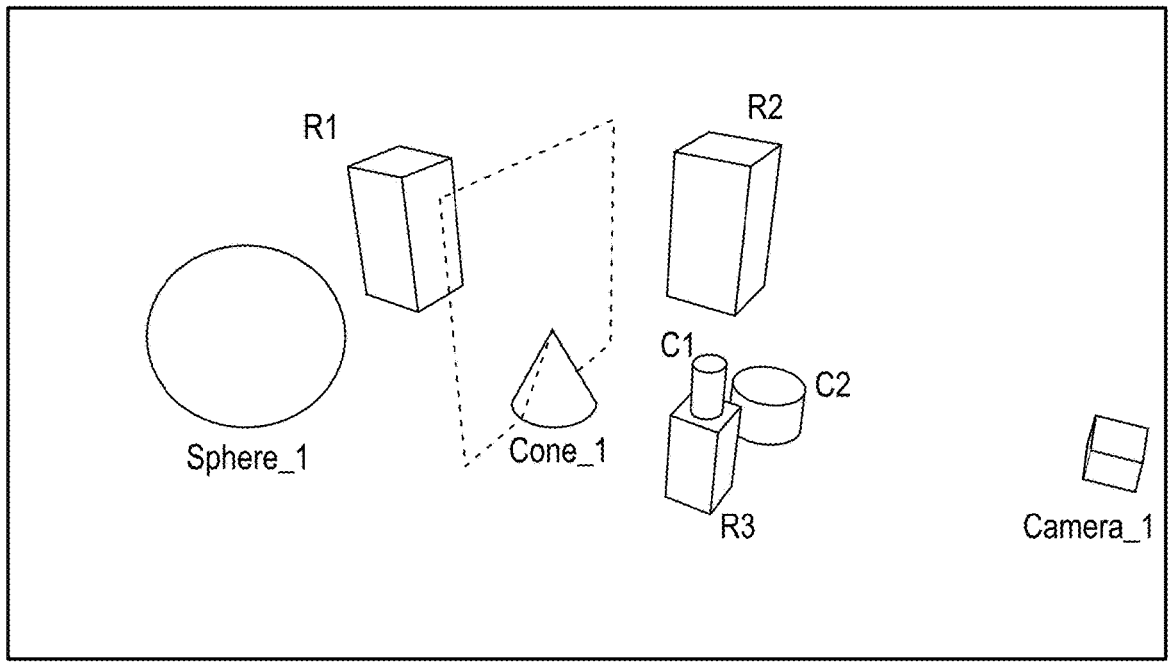
FIG. 4A is a perspective view of an exemplary scene for illustrative examples of spatial image sanitization.
Figure 4B:
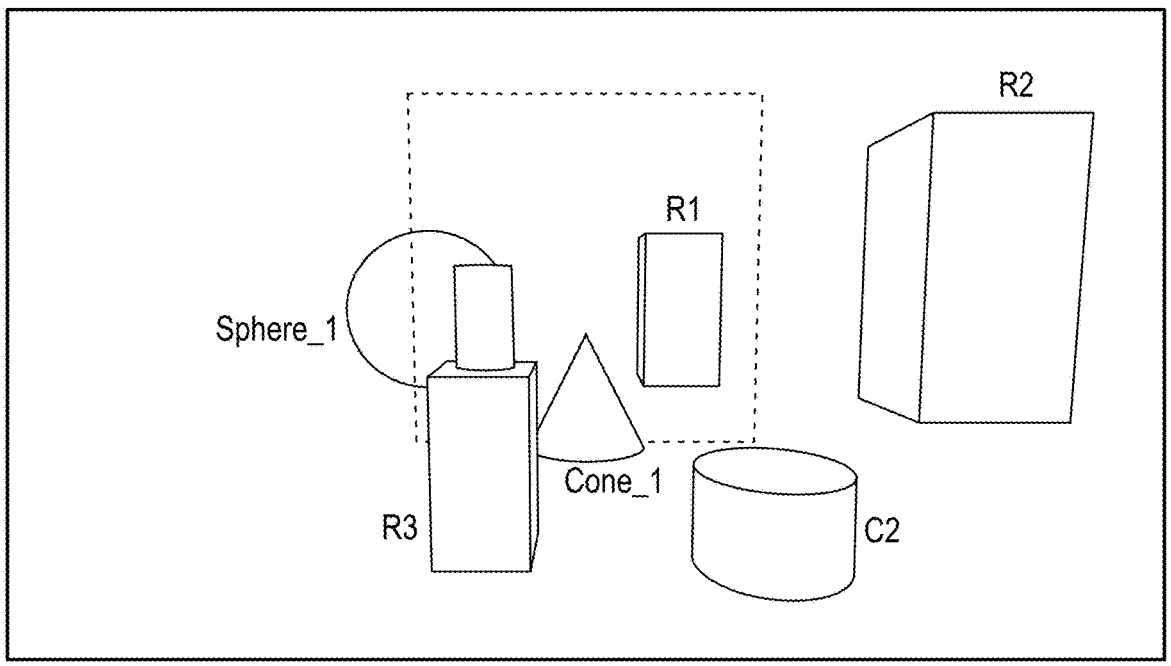
FIG. 4B is a perspective view of the exemplary scene from a front facing camera.

Variations of applying spatial interpretation can enable image sanitization to be applied to image data spatially behind, in front, connected, contained, or otherwise related to the reference sanitization region. As shown in exemplary scenario of FIGS. 4A and 4B, various objects may be positioned relative to a spatial redaction region (indicated with dashed lines), which will be used as a way of illustration of variations below. Shaded areas indicate exemplary sanitization image regions for image sanitization (e.g., redaction, blurring, etc.). FIG. 4A shows the scene from an off-camera perspective, and FIG. 4B shows the same scene from a main camera. The scene includes Sphere_1 which is behind the reference region and not fully covered by the reference region; R1 a rectangular prism that is behind the reference region and fully within the projection of the reference region; R2 a rectangular in front of the reference region and not within the projection of the reference region; C2 a cylinder that is in front of the projection region and not within the projection region of the reference region; R3 a rectangular prism in front of and partially within the projection of the reference region; C1 a cylinder stacked on top of R3 and in front of the reference region and fully within the projection of the reference region; and Cone_1 a cone that intersects the reference region.

Figure 5A:
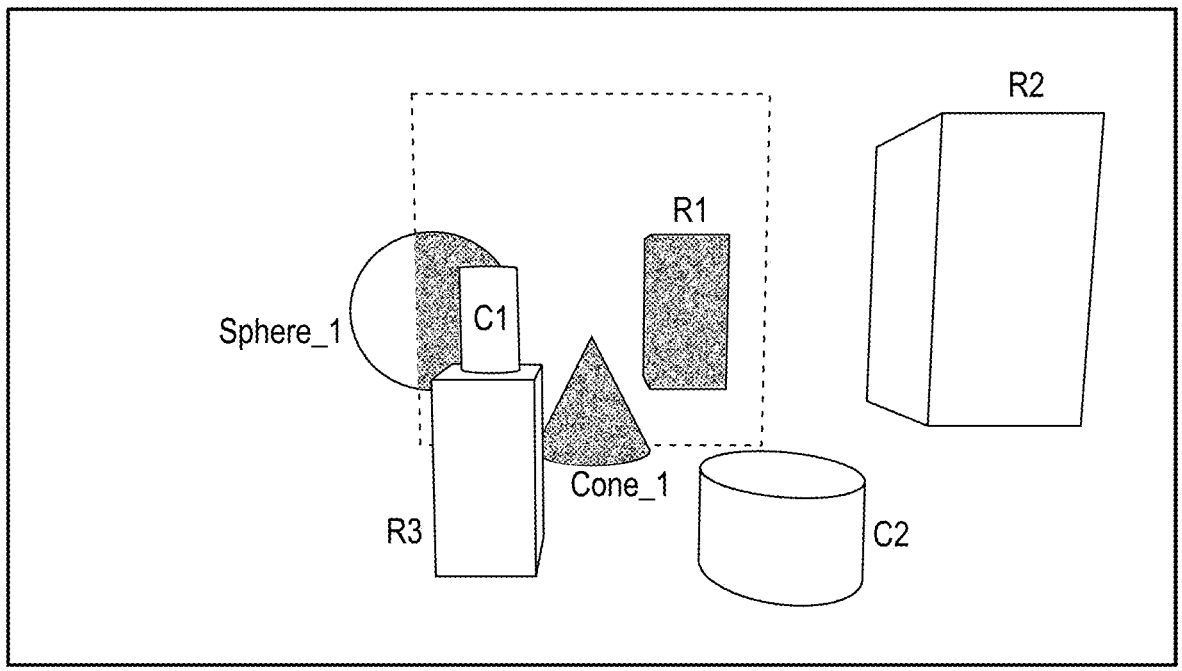
FIGS. 5A and 5B are examples of image sanitization for pixel data determined to be behind a reference sanitization spatial region.
Figure 5B:
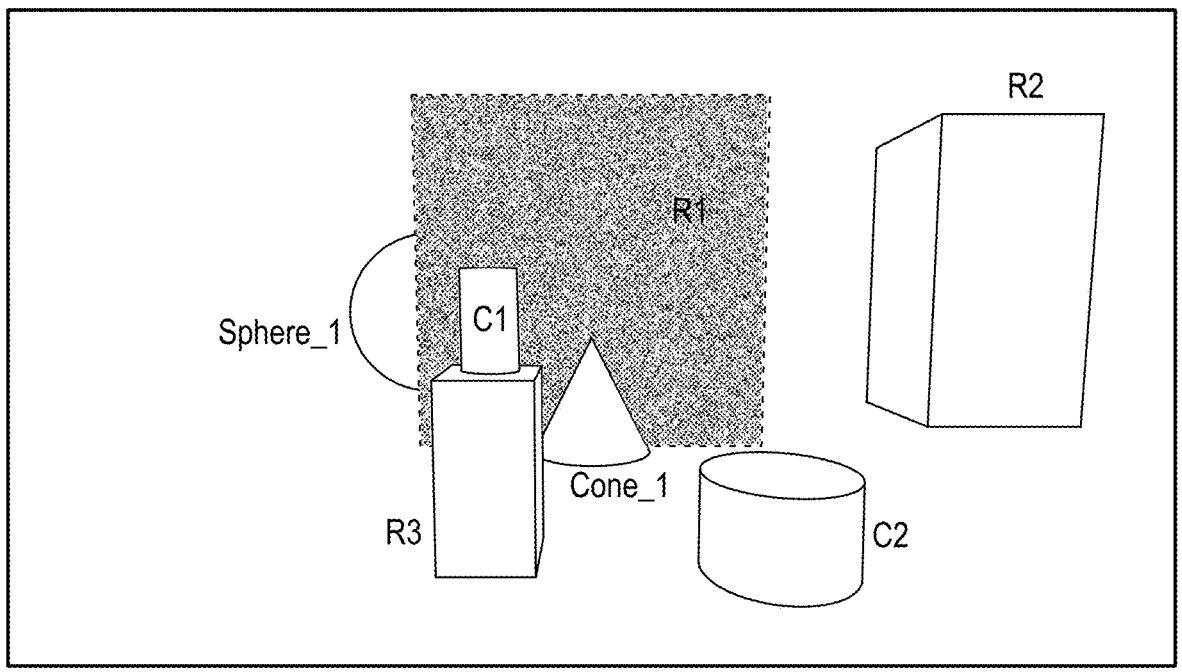

As shown in FIGS. 5A and 5B, spatially selecting portions of the image data may include spatially selecting portions of the image data beyond a reference sanitization spatial region (i.e., "reference region"). Behind here can describe pixels that are in an image region masked by a reference region and further than the distance from the imaging device to the reference region. For example, a 2D or 3D reference region may be established (e.g., predefined in the sanitization configuration or dynamically assigned through object detection), and then any pixel data in the image data that is beyond the reference region can be subject to image redaction. As shown in FIG. 5A may assign a sanitization image region to any object in line with the reference region as viewed by the camera and intersecting or beyond the reference region. As shown in FIG. 5B, the reference region may be used so that any foreground elements are substantially preserved with original image data but pixel values greater further than the reference region and in line with the projection from the camera to the reference region. Other suitable rules can similarly be used.

Figure 6:
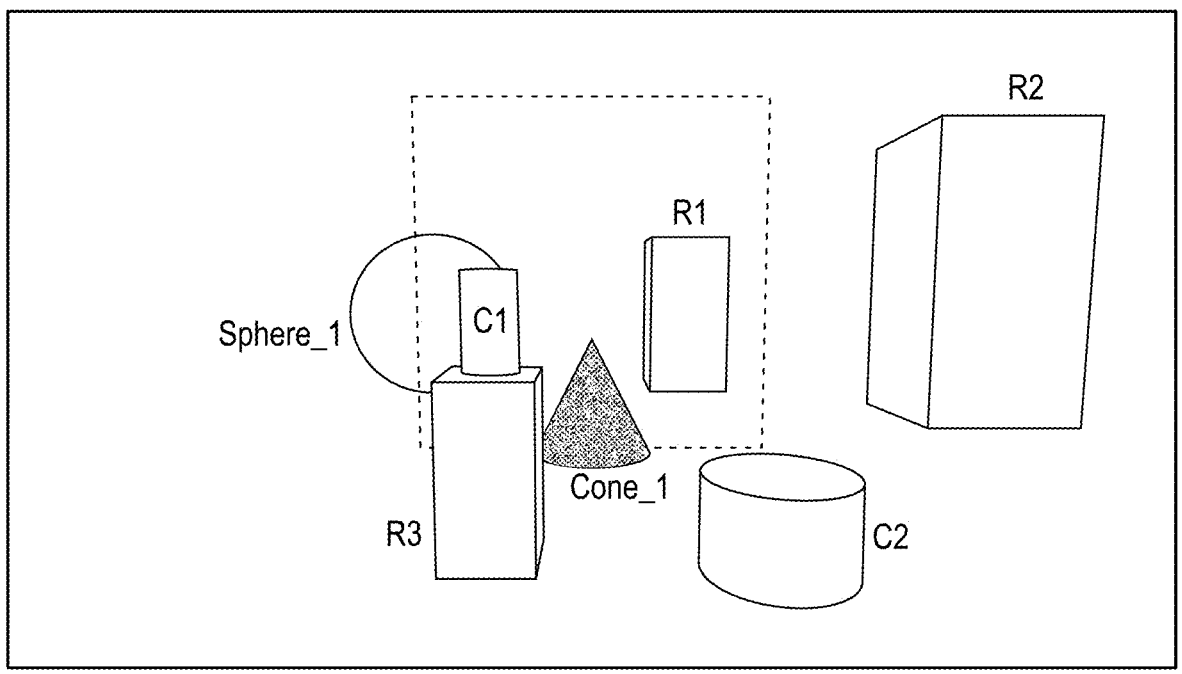
FIG. 6 is an example of image sanitization for pixel data determined to be associated with an object intersecting a reference sanitization spatial region.

As shown in FIG. 6, spatially selecting portions of the image data may include spatially selecting portions of the image data that intersect with the reference sanitization region. This may include detecting objects intersecting the reference sanitization region, segmenting image region of the object(s) intersecting the reference region and then selecting object segmented image regions. In FIG. 6, Cone_1 intersects the defined 2D reference region and therefore the image data detected to be associated with the Cone_1 is selected for sanitization. This may be used, for example, to blur a person interacting with an ATM machine.

Figure 7A:
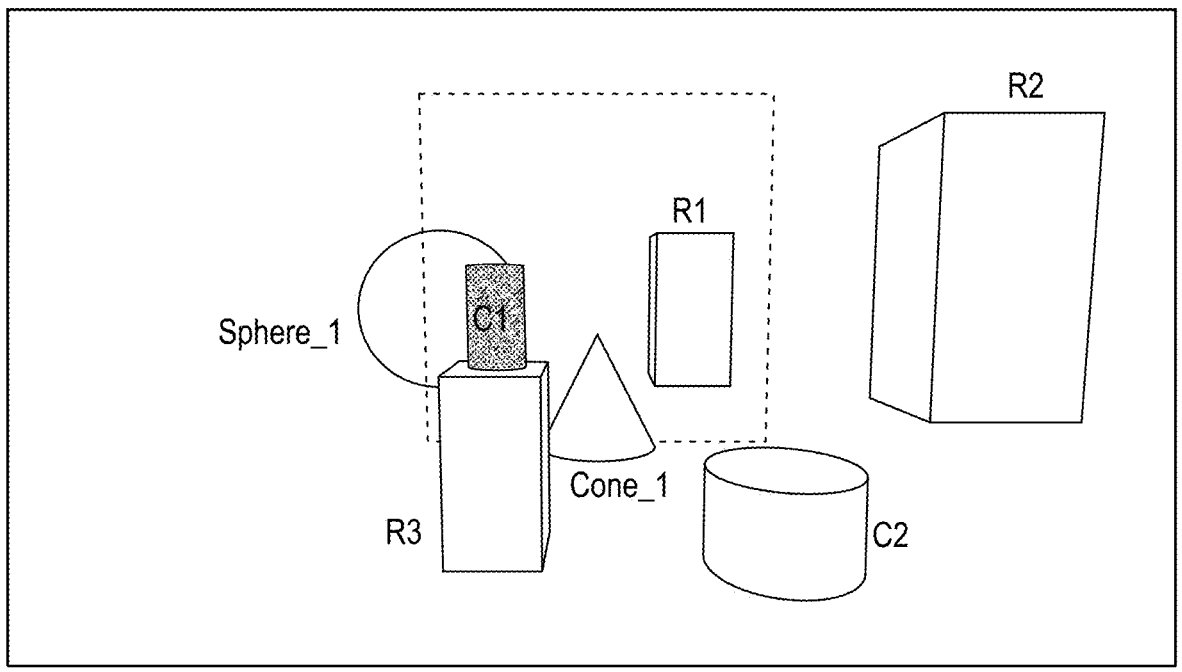
FIGS. 7A and 7B are examples of image sanitization for pixel data determined to be in front of a reference sanitization spatial region.
Figure 7B:
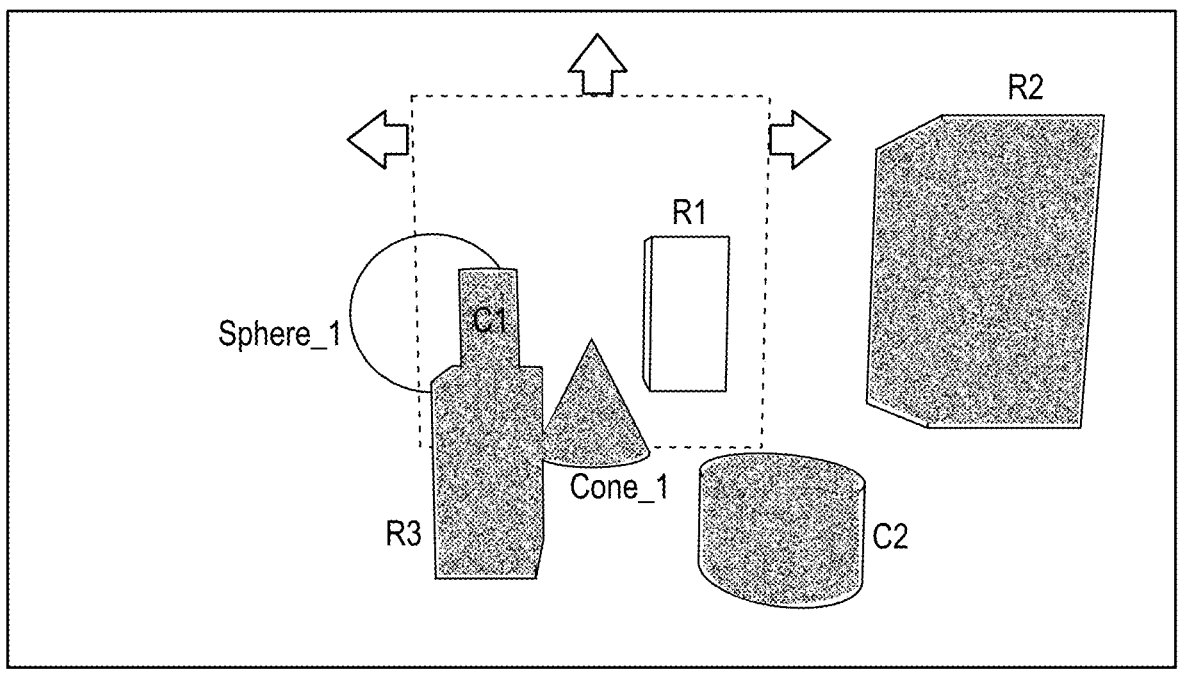

As shown in FIGS. 7A and 7B, spatially selecting portions of the image data may include spatially selecting portions of the image data in front of a reference sanitization region. Image data in front of the reference sanitization region generally describes image data in the foreground relative to the reference sanitization region. More specifically, this describes pixel that are within an image region defined by a projection from the imaging device to the reference sanitization region and are at a distance less than the distance from the imaging device to the reference sanitization region. For example, a 2D or 3D reference sanitization region may be established (e.g., predefined in the sanitization configuration or dynamically assigned through object detection), and then any pixel data in the image data that is beyond the reference sanitization region can be subject to image redaction.

As shown in FIG. 7A, this form of selecting image data can be filtered or limited to specific objects like the cylinder C1. In this way, specific objects that are in front of the reference region can be selected for image sanitization. This object selection can similarly be applied to the other relative positioning variations described herein.

As shown in FIG. 7B, a reference region could be defined as a continuous plane extending outwardly, such that any object in front of (or otherwise positioned relative to the plane) can be selected for image sanitization.

Figure 10A:
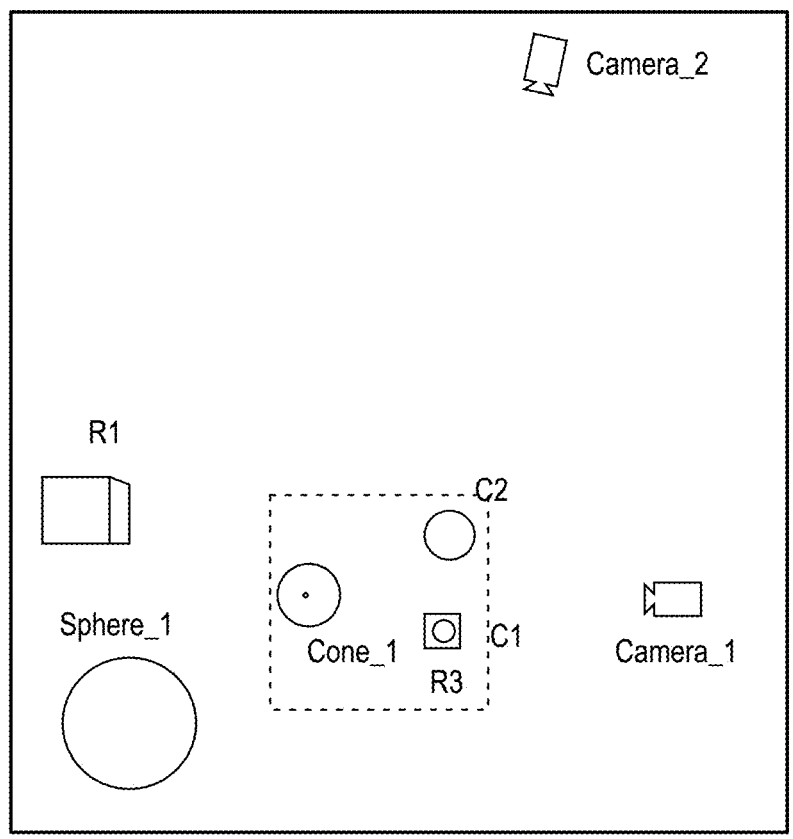
FIG. 10A is a top down view of the layout of a third exemplary scene which has two imaging devices partially viewing the second scene, where the reference sanitization spatial region is defined as a rectangular volume.
Figure 10B:
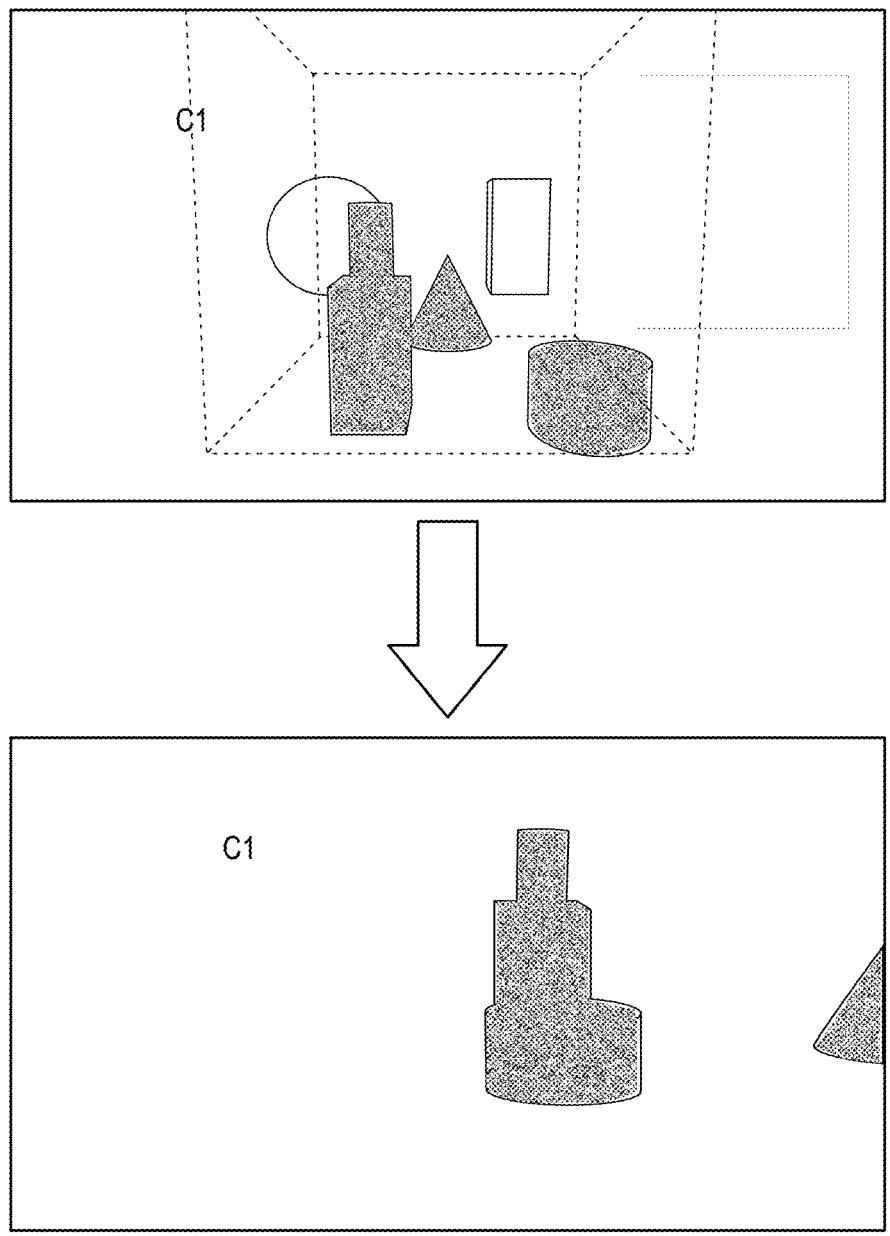
FIG. 10B is a schematic representation of coordinating image sanitization between the two cameras of the third scene.

As shown in FIGS. 10A and 10B, spatially selecting portions of the image data may alternatively include spatially selecting portions of the image data spatially within a spatial volume defined by the reference sanitization region. For example, pixel data in the image data that is spatially mapped to a position that is defined within a 3D reference sanitization region can be subject to image redaction. As shown in FIG. 10B a reference sanitization region can be defined as a rectangular prism, and any object or image data associated with a spatial location within the defined volume may be selected for image sanitization. FIG. 10B also shows how image selection can be combined with other techniques such as coordinating multiple imaging devices.

Spatially selecting portions of the image data may include spatially selecting portions of the image data that are spatially within some spatially defined proximity to the reference sanitization region. In general, this variation can include selecting portions of the pixel data of the image data that is spatially within some distance threshold from the reference sanitization region. For example, all pixel data within two feet from a defined rectangular surface may be selected for image sanitization.

Spatially selecting portions of the image data may alternatively include spatially selecting portions of the image data that is associated with an object in contact with or within a set proximity to the reference sanitization region. This variation maybe used to extend image sanitization to objects in connection with the reference sanitization region. This variation may include applying image segmentation to an object and then determining the object satisfies a connection condition with the reference sanitization region. A connection condition could be a condition when the object is partially within thin the volume defined by the reference sanitization region. A connection condition could be a condition when the object is within some defined proximity threshold to the reference sanitization region. A connection condition may alternatively be any suitable condition relating the position of the object to another reference point. As an example, object connection selection, if an object is detected to be partially within a defined sanitization volume, then all pixel data associated with the object may be subject to image redaction.

Figure 8:
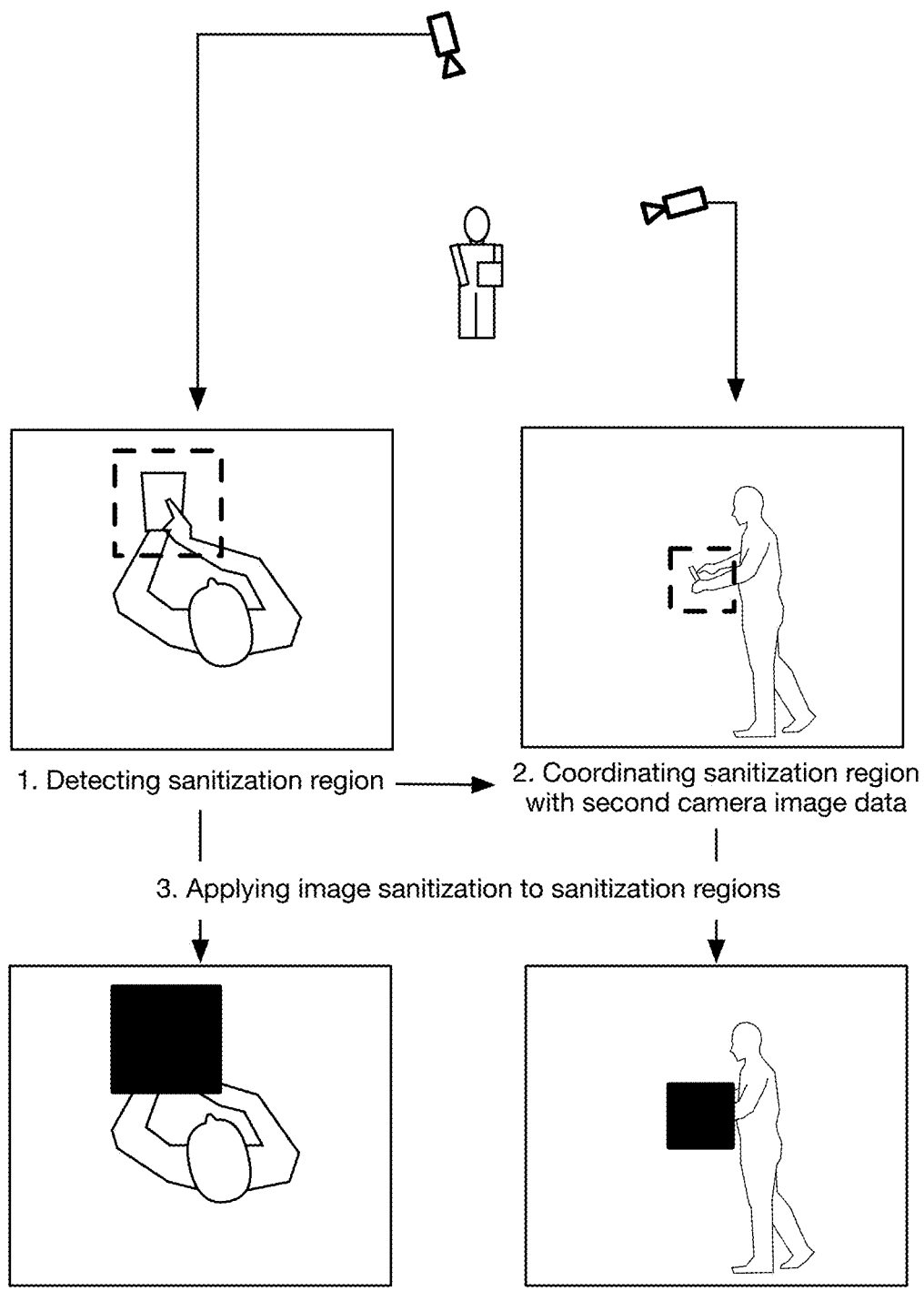
FIG. 8 is a graphical representation of coordinated image sanitization translated across multiple imaging devices monitoring of an interaction detection module.

In some variations, image sanitization may be coordinated between different sets of image data. Such variations may involve the translating object location between cameras for purposes of synchronizing image sanitization of an object. Translating object location may include modeling three-dimensional position of the sanitization region. In one preferred variation, the three-dimensional position can be used in synchronizing sanitization regions between cameras as shown in FIG. 8. Preferably, two or more cameras may have synchronized relative positioning such that one can translate a three-dimensional position of one camera to the three-dimensional position in another camera.

More generally, coordination of image sanitization can be used in coordinating image sanitization of any suitable region between cameras. Coordinating determination of sanitization regions can make use of spatial understanding of the image data. As shown in exemplary scenarios of FIGS. 9A and 9B and FIGS. 10A and 10B, selecting a sanitization region can include detecting object location from image data of a first imaging device and translating object location to a region of image data in another imaging device. The region of image data resulting from this translation can be selected as for image sanitization. This coordination between imaging devices can function to use the perspective of view of one camera to alter the image sanitization in a second camera. Translating object location to other imaging devices may be used so that imaging devices with differing perspectives of an object can appropriately apply image sanitization to a target object based on a selected sanitization region from another imaging devices.

Figure 9A:
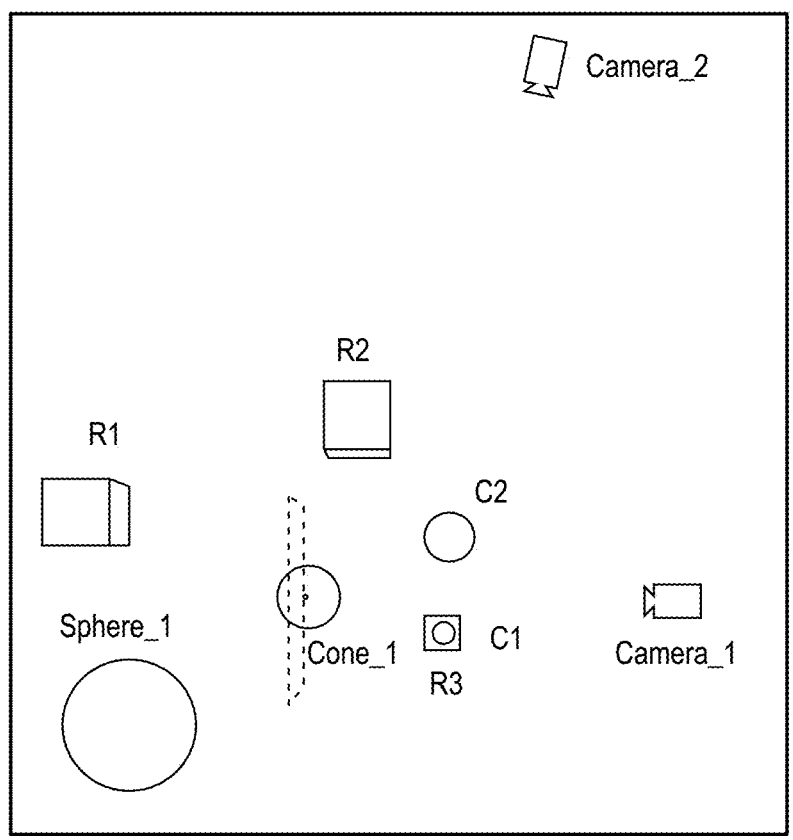
FIG. 9A is a top down view of the layout of a second exemplary scene which has two imaging devices partially viewing the second scene.
Figure 9B:
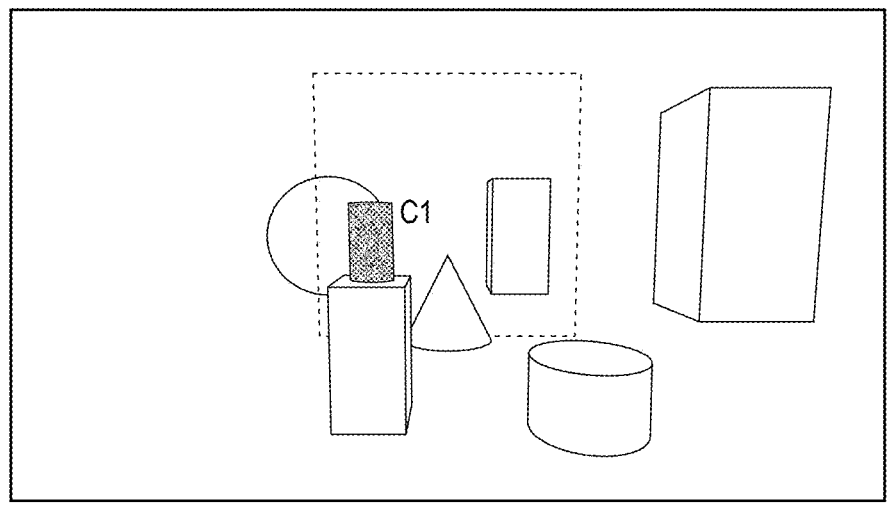
FIG. 9B is a schematic representation of coordinating image sanitization between the two cameras of the second scene.
Figure 9B:
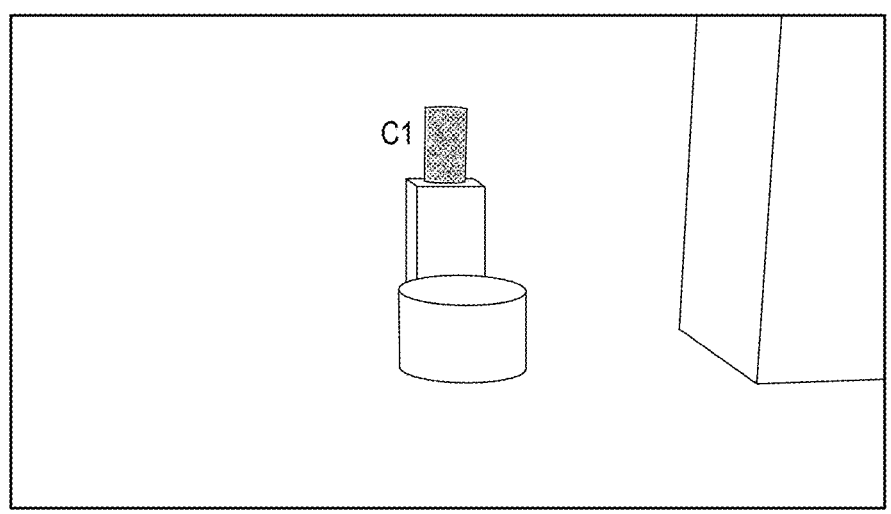

In the example of FIGS. 9A and 9B, C1 may be selected based on its position relative to a 2D reference region. The spatial correlation of C1 as imaged by camera_1 and camera_2 is used to then select the image data of C1 from camera_2 for image sanitization.

In the example of FIGS. 10A and 10B, volumetric reference regions may be used in setting the sanitization image regions, and this may be applied across cameras.

In an example of applying this technique, a person using an ATM may be detected and recognized by a camera facing the ATM. In this variation, the spatial understanding of that person's position can be used to direct image sanitization applied by another camera such as one that is viewing the person from the side, possibly without a direct view of the ATM device. In environments where there may be multiple cameras, this approach works to make image sanitization more completely secure sensitive activities or objects despite the point of view of the imaging device.

Spatial interpretation of the image data of multiple imaging devices used in interpreting object-occlusion of the sanitization region, which functions to appropriately address application of a sanitization region when other objects block the view of the sanitization region. For example, if another object is obscuring the detected object, sanitization may not be needed for the image data from the other imaging device.

Figure 13:
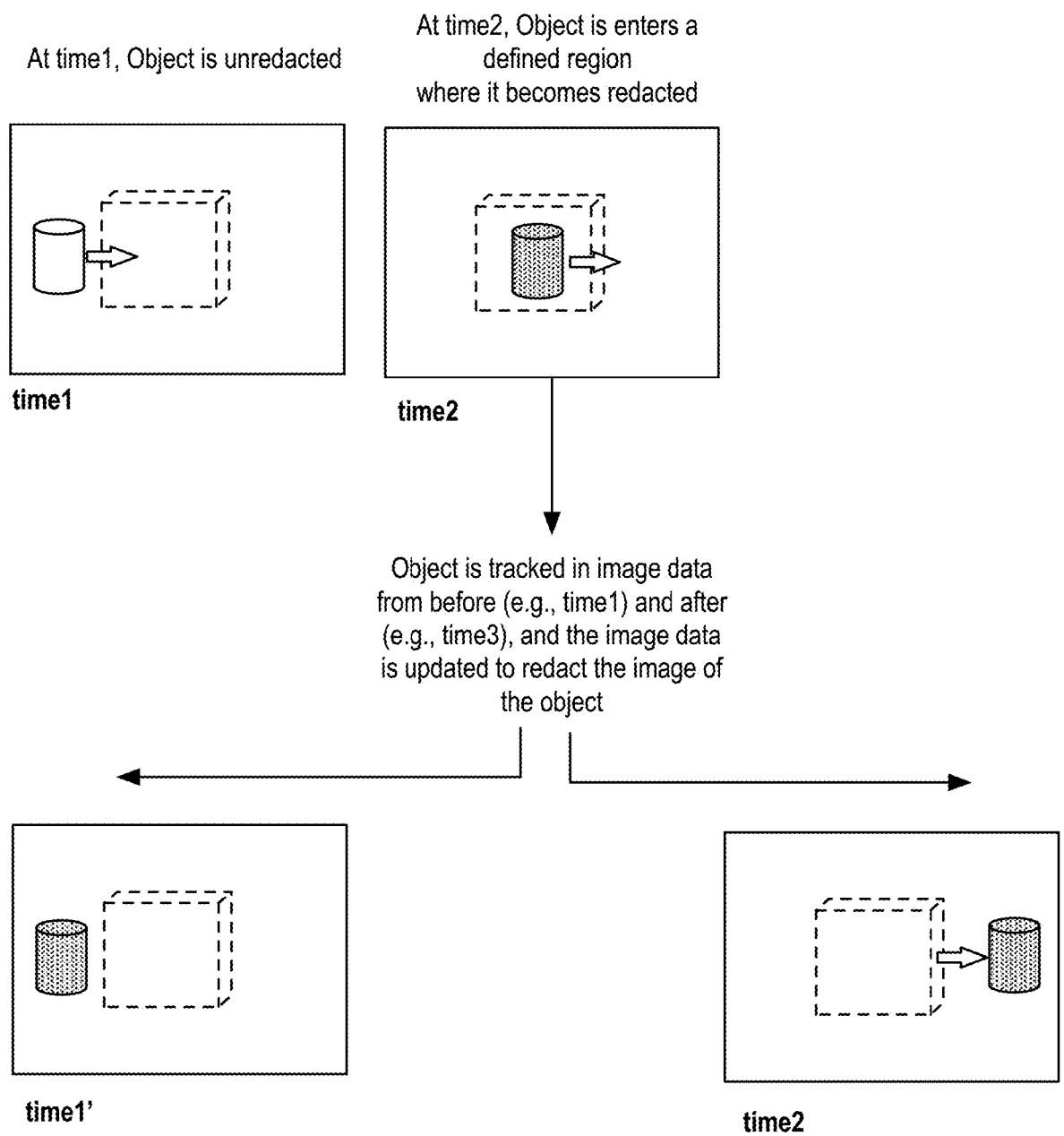
FIG. 13 is a schematic representation of tracking an object identified for image sanitization.

As discussed, one possible option for image sanitization is to track objects for image sanitization after determining they should be subject to imaged sanitization. Accordingly, in some variations, selecting a sanitization region can include tracking an object through any suitable process of CV object tracking as shown in FIG. 13. Tracking a sanitization region preferably tracks the object within the image data from a single imaging device. Tracking an object can be performed continuously moving forward. As discussed, tracking and the application of image sanitization may additionally or alternatively work retroactively, where tracking tracks an object backwards in collected image data. Tracking a sanitization region may additionally include tracking the object across multiple imaging devices. This may be used in appropriately applying image sanitization as an object moves across an environment. This may include detecting an object leaving field of view of one imaging device and entering field of view of a second imaging device, and if the object is subject to image sanitization reestablishing and applying image sanitization in image data of the second imaging device.

When tracking an object for image sanitization, the image data of the object may be reevaluated to determine if image sanitization is required and/or to determine how to apply image sanitization.

Figure 11A:
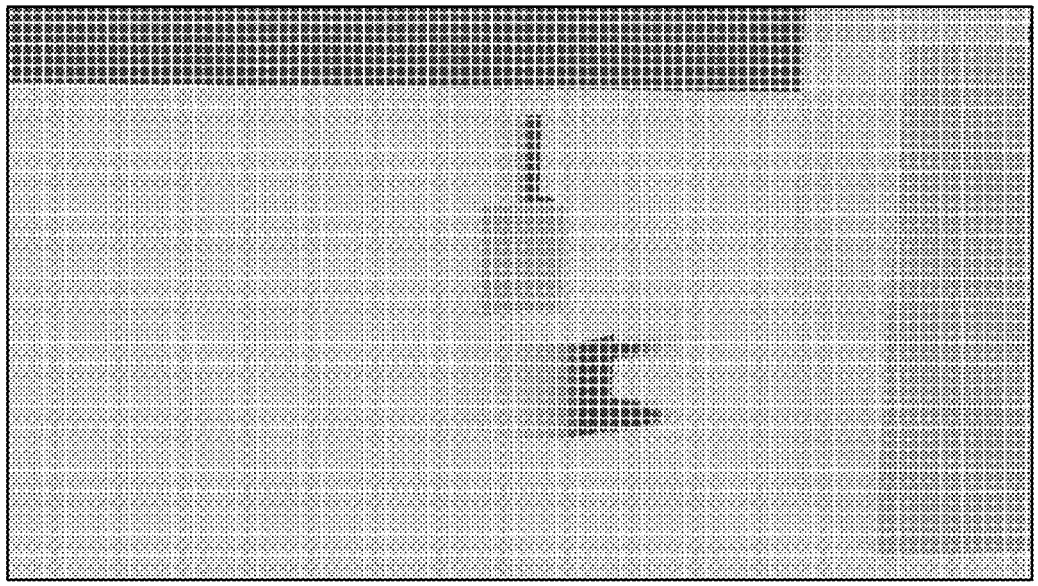
FIGS. 11A and 11B are exemplary spatial maps from camera_1 and camera_2 from the second exemplary scene.
Figure 11B:
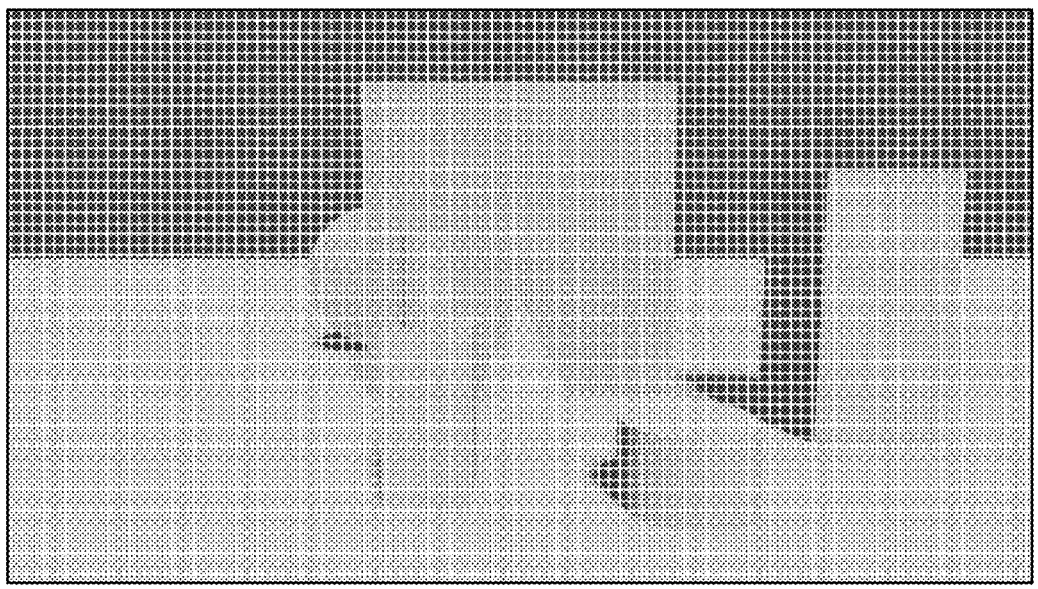

As discussed, spatial image sanitization may be used in a variety of ways for the purposes of defining where and how to sanitize image data. In using the spatial information, the method may additionally include generating a spatial interpretation of image data. The spatial interpretation of the image data may be a 3D interpretation, a 2.5D interpretation (e.g., a projected depth map of pixel values), a version of foreground/background interpretation, and/or other formats that provide some level of positional information beyond a 2D image of a scene. The spatial interpretation can be used in determining how to dynamically select pixel values of the images (e.g., the sanitization image region) based on spatial positioning of pixels and/or objects. The spatial interpretation can additionally be used in coordinating image sanitization between imaging devices with overlapping fields of view. As shown in FIGS. 11A and 11B, an approximate spatial map of the image data corresponding to the image data of exemplary cameras camera_1 and camera_2 from the example of FIG. 9A may be used in translating image sanitization between cameras.

In some variations, the spatial information is sensed using the imaging device or another sensor device. The spatial information may alternatively be predicted. For example, a depth map may be predicted from image data from a single imaging device. The spatial information may alternatively be provided at least in part from three-dimensional model mapped to the image data. For example, a 3D model of the environment with stationary fixtures like shelves, kiosks, and the like can be constructed and then paired or aligned with the image data.

In one implementation, generating a spatial interpretation of image data and thereby spatially interpreting image data may include predicting a depth map from image data. In this variation, static image data may be used in generating a corresponding depth map using various techniques such as applications of deep neural networks or other forms of deep learning, machine learning, or computer vision. Other approaches may additionally use the temporal dimension of video data for generation of depth information. In this depth map, pixels within the image data may be directly mapped to a corresponding position relative to the imaging device.

In one implementation, generating a spatial interpretation of image data can include sensing depth data in coordination with collecting image data. Depth data may be sensed by a secondary sensor, which may or may not be aligned or positioned near the imaging device. Sensing depth data may be collected from a stereo imaging device, a structured light 3D scanner, time-of-flight imaging sensor, a LIDAR imaging sensor (i.e., a 3D laser scanner), and/or other suitable types of sensor devices.

In another implementation, generating a spatial interpretation of image data may employ techniques with coarse or low resolution spatial information. In particular, some spatial interpretations may involve segmenting image regions into background and foreground elements.

Block S124, which includes applying image sanitization to the sanitization region, functions to augment the image data in an appropriate manner. Applying image sanitization can include redacting, reducing resolution/fidelity, modifying, encrypting, and/or applying other suitable modifications to the sanitization region. In one variation, one of the image sanitization approaches is used in a similar manner for every region of image sanitization. In another variation, different sanitization regions can have different forms of image sanitization used. The type of image sanitization may be selected from a set of possibilities. In one variation, the type of image sanitization depends on the detected object. The application of image sanitization may be applied using basic region geometry (e.g., a blacking out a rectangle thereby covering an object). Applying image sanitization to a sanitization region may alternatively apply image transformations to an object-segmented portion of the image data.

Applying image sanitization to the sanitization region will generally include applying image pixel transformations according to area defined by the pixel positions of the sanitization image region. This may include changes to pixel values outside of the bounds of that area. For example, if the pixel transformation includes a spread property where pixel transformations may extend beyond a pixel location.

The type of image sanitization may modify the representation of the image data to reduce or alter the information conveyed in the image data as interpreted by a human viewer. Additionally or alternatively, some forms of image sanitization may modify the representation of the image data to reduce or alter the information interpretable by a machine system. This may be used to prevent or confuse later CV processing.

Applying image sanitization may be the application of one or more of a variety of image sanitization processes. Some variations described below may include irreversibly redacting, reversibly redacting, or otherwise transforming the pixel values of the image data. Irreversibly redacting may include redacting image data (e.g., blacking out) or reducing resolution of fidelity of indicated image data (e.g., blurring/pixelizing/filtering). Reversibly redacting may function to enable the original image data to be retrieved. For example, a region of image data may be transformed into encoded pixel values where a key may be used to decode the original pixel values. Other transformations of the pixel values may include introducing synthesized or alternative imagery into the image data, preventing pixel changes from long term pixel values (e.g., filtering pixel values to that transient image changes are prevented in that region), perturbing pixel value to alter machine interpretation.

A variation of applying image sanitization that includes redacting image data may function to remove at least a portion of image data entirely. Redacting image data can include replacing a region of a video with an alternative graphic. In one example, this includes replacing region with pixels of a particular color such as by blacking out pixels in the sanitization region.

A variation of applying image sanitization that includes reducing resolution or fidelity of the image data may function to reduce or obscure the conveyed information present in the image data. One form of reducing resolution can be applying an image blur filter. In other variations, the effective image resolution, color information, and/or other aspects may be transformed by locally applying an image filter and then overwriting the image data in that region for the sanitized image data. As one exemplary application, reducing image resolution of a screen may be used to prevent reading of content on the screen but show general activity with the screen.

Variation of applying image sanitization that include modifying image data may include other processes that can be used in addition to or as an alternative to sanitization processes described herein.

In one variation modifying image data can include replacing with alternative or synthesized version of original. For example, faces in a video may be modified with a generic facial representation such that facial expressions can still be expressed but identity is preserved. In this way, the image data is visually equivalent to the original but with detailed aspects of the image data normalized to non-revealing representations. In another example, people visible in the image data may be artificially removed from the image data and replaced with a modeled representation of the user. For example, user pose estimation may be used to represent gross motions of the user that can be normalized and prevented from exposing detailed actions like facial expressions or manual key input for a device. For example, an image of a person interacting with an ATM could be reduced to a high-level pose estimation of the user interacting with the ATM so general activity of the user is preserved (possibly for security purposes) but not detailed activity.

In a variation that reversibly modifies image data, modifying the image data can include encoding and/or encrypting pixel values of the image data, which can function to convert the image data in a manner that retains a portion of data. Encoding and/or encrypting pixel values of the image data generates alternative pixel representation which may be visually noisy and uninterpretable, but which can be returned to original pixel values by decoding and/or decrypting the image data. In one variation, the image data in the sanitization region can be converted to an image representation that embeds key information. In another variation, encrypting image data can convert the image data into a format that can be decrypted by a key holder. In such a variation, a sanitized region is transformed into a visually encoded subregion of image data. The visually encoded subregion may be encrypted using a public key such that access to a private key may decrypt the sanitized subregion of the image data. For example, a public key may be used to apply a transformation to the image data visually rendering a portion of the image data modified. That encrypted portion however may be reversibly decrypted to reveal the original image data and/or other information embedded in the image data. In one implementation, all the original image data may be cryptographically embedded into the image data so that the original and sanitized versions are merged. In another implementation, the original image data is stored separate from the sanitized image data but is made accessible such that through a process of decrypting the image data the original image data may be assembled.

In another variation, modifying the image data may include selectively altering the image data to a form with altered machine interpretation. This variation may apply image cloaking techniques, which make pixel changes to alter or prevent interpretation by computer analysis such as classification using a neural network. These changes, which may be characterized as adversarial changes to pixels, can alter the results of machine interpretation or preventing machine interpretation. In one variation, altering the image data may alter machine interpretation to a proxy identifier. The proxy identifier can be stored and associated with corresponding information, but can function to disassociate machine interpretation with the actual information.

As discussed above, in some variations image sanitization may be applied longitudinally forward and/or backwards in the image data. Accordingly, applying sanitization to the sanitization region may additionally include longitudinally applying image sanitization to an object as shown in the example of FIG. 11. In one variation, applying image sanitization may include reverse tracking an object in preceding image data and applying image sanitization relative to an object of the sanitization region in the preceding image data and/or tracking an object associated with the sanitization region in subsequent image data and applying image sanitization in the subsequent image data based on tracking of the object. This can function to preserve privacy throughout a collection of image data. There may be particular instances where an occurrence of some interaction or scenario may benefit from applying image sanitization retroactively and for some duration into the future.

Block S130, which includes managing storage of image data, functions to handle storage and access to image data in original and sanitized forms.

In one variation, original image data (pre-sanitization) can be stored in a data storage system and then processing of the image data and generating sanitized image data is applied using the stored image data. In this manner, the original version of the image data can be preserved. The sanitized image data may be separately stored, communicated to another system, and/or used to replace the stored image data. In one variation, the sanitized image data may be stored separately for use with particular systems, while the original may be used as a canonical record. In another variation, image data meeting certain conditions may be replaced with sanitized image data, which functions to store partially sanitized and unsanitized image data. For example, image data may be updated to sanitized image data after some set time duration (e.g., 24 hours, 1 week, etc.). In another variation, sanitized image data may be generated in response to a request. The request may be a programmatic request from another system or a user request for a user trying to view/access the image data. On-demand image sanitization like this functions to share image data with external parties or systems while scrubbing the image data from sensitive information.

In another variation, processing of the image data and generating sanitized image data is performed in transition such that only sanitized image data is permanently stored. During such an implementation, a portion of the image data may be stored temporarily (e.g., such as in a buffer) to facilitate processing and communication of the image data.

In one implementation, image data processing can be performed at or near the imaging device. For example, an image processing system may locally process of the image data prior to communicating image data to outside computing systems. In another example, an image processing system may locally process image data of a subset of imaging devices prior to communicating image data to outside computing systems.

Some variations may include coordination of image sanitization across cameras. Since spatial image sanitization may leverage spatial definition of how to alter an image the spatial information can be communicated and locally processed at the corresponding image device.

There are many variations in how the system and method may be implemented. Below is a non-exhaustive list of some exemplary implementations and variations, which may be altered or extended using the teaching herein.

In one exemplary variation, the system and method may be implemented by a non-transitory computer-readable medium storing instructions that, when executed by one or more computer processors of a communication platform, cause the communication platform to perform the method.

In another exemplary variation, a system comprising of one or more computer-readable mediums storing instructions that, when executed by the one or more computer processors, cause a computing platform to perform operations of the method.

In an exemplary spatial sanitization variation, selecting the sanitization image region can involve the selection of pixels in the image data based on spatial position of the pixels relative to a reference region (which may be configured manually, set based on object or event detection, defined by detected markers, and the like). In such a variation the method may include: collecting image data from an environment; collecting spatial information corresponding to the image data; selecting a sanitization image region in the image data based at least in part on the spatial information, wherein selecting the sanitization image region in the image data comprises determining a reference sanitization spatial region defined spatially relative to the image data and selecting pixels in the image data based on spatial position of the pixels relative to the reference sanitization spatial region, wherein the pixels selected define the sanitization image region; and applying image sanitization to the sanitization image region thereby generating sanitized image data. This variation can enable a defined reference sanitization spatial region to direct how objects and/or pixels are selected for image sanitization.

In a related spatial sanitization example, selecting the pixels in the image data based on spatial position of the pixels relative to the reference sanitization spatial region can include selecting the pixels in the image data that are defined to be spatially behind the reference sanitization spatial region such as shown in the limited examples of FIGS. 5A and 5B.

In a related spatial sanitization example, selecting the pixels in the image data based on spatial position of the pixels relative to the reference sanitization spatial region can include selecting the pixels in the image data that are defined to be spatially in front of the reference sanitization spatial region, such as shown in the limited examples of FIGS. 7A and 7B.

In a related spatial sanitization example, wherein selecting the pixels in the image data based on spatial position of the pixels relative to the reference sanitization spatial region can include detecting an object intersecting with a position defined to intersect the reference sanitization spatial region, and selecting the pixels associated with the object, such as shown in the limited examples of FIGS. 7A and 7B. This may involve image segmentation and interpreting or predicting position of the object.

In a related spatial sanitization example, the reference sanitization spatial region can define a volume within the environment. In this example, selecting the pixels in the image data based on spatial position of the pixels relative to the reference sanitization spatial region can include selecting the pixels in the image data that are defined to be spatially within or overlapping the volume of the reference sanitization spatial region, such as shown in the limited examples of FIGS. 7A and 7B.

In another spatial sanitization example, multiple images may use synchronized spatial modeling or sensing of the environment to coordinate image sanitization. In one such example, the method may include collecting a first set of image data from a first imaging device and a second set of image data from a second imaging device; collecting spatial information corresponding to the image data; synchronizing spatial information of the plurality of imaging devices; selecting a sanitization image region in the image data based at least in part on the spatial information, which comprises: selecting a first sanitization image region in the first set of image data from the first imaging device based at least in part on the spatial information, and translating spatial information of the sanitization image region to the second set of image data from the second imaging device and selecting a second sanitization image region in the second set of image data; and applying image sanitization to the sanitization image region thereby generating sanitized image data, which comprises applying image sanitization to the first sanitization image region and the second sanitization image region, such as shown in examples of FIG. 8, FIGS. 9A and 9B, and FIGS. 10A and 10B.

Synchronizing can include meshing, merging or otherwise aligning the spatial information. The spatial information may be based on image alignment, object alignment, spatial, various photometry techniques, and/or any suitable process for aligning commonly viewed elements in an environment. Synchronizing may also be a manual process performed during configuration of the system. In this variation, the plurality of imaging devices can include different fields of view of the environment. Collecting the image data can include collecting image data from a plurality of imaging devices, wherein synchronizing and selection of sanitization image region can be coordinated across more than two imaging devices.

In a related variation of the multiple camera example, at least one of the imaging devices may be a mobile imaging device. For example, the second imaging device in the variation above may be a mobile imaging device such as a pair of smart glasses. A mobile device variation may further comprise at the mobile imaging device calculating position and orientation and synchronizing field of view of the mobile imaging device to the spatial information of the image data. This may be used in synchronizing spatial information of one imaging device with a mobile imaging device.

In another example, image sanitization for a detected object may be applied as the object is tracked, which could be used to update old image data and/or to direct image sanitization of new image data. In one such example, wherein selecting a sanitization image region in the image data based at least in part on the spatial information comprises at a first instance detecting an object in the environment and selecting the sanitization image region to include image data of the object; tracking the object backwards from the first instance within the image data and applying image sanitization to image data of the object; and tracking the object forwards from the first instance within the image data and applying image sanitization to image data of the object. Variations may alternatively only track backwards or forwards.

In another example, image sanitization can be reactive to a detected object wherein the method includes collecting image data from an environment; detecting an object registered for image sanitization; selecting a sanitization image region in the image data based on location of the object in the image data; and applying image sanitization to the sanitization image region thereby generating sanitized image data.

More specifically, object detection can be combined with spatial sanitization wherein an implementation of the method can include collecting image data from an environment; detecting an object registered for image sanitization; collecting spatial information corresponding to the image data and the object; selecting a sanitization image region in the image data based at least in part on the spatial information of the object; and applying image sanitization to the sanitization image region thereby generating sanitized image data.

4. System Architecture

The systems and methods of the embodiments can be embodied and/or implemented at least in part as a machine configured to receive computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

In one variation, a system comprising of one or more computer-readable mediums storing instructions that, when executed by the one or more computer processors, cause a computing platform to perform operations comprising those of the system or method described herein such as: collecting image data; processing image data and thereby generating sanitized image data, which includes selecting a sanitization region in the image data and applying image sanitization to the sanitization region; and managing storage of image data.

Figure 17:
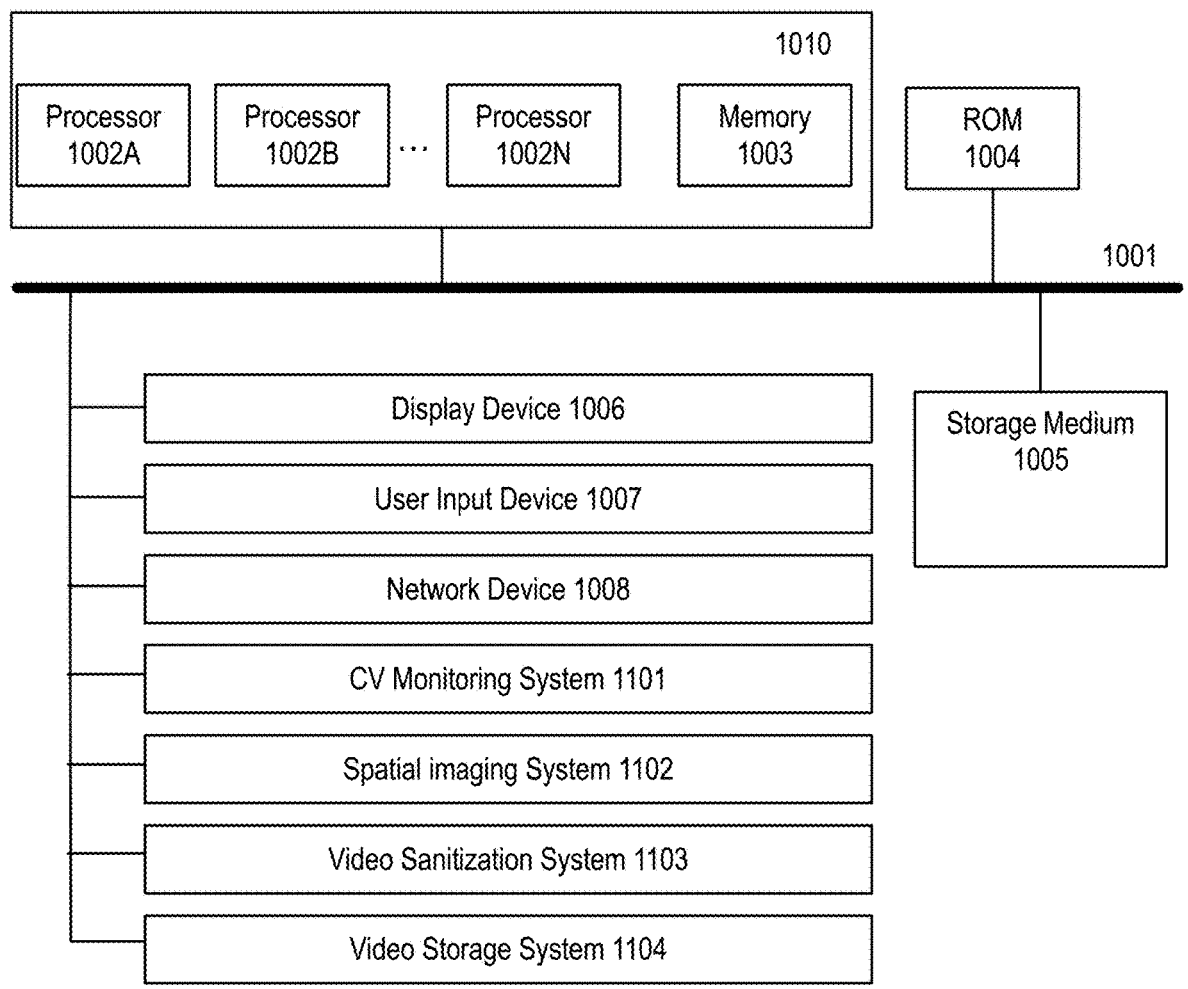
FIG. 17 is an exemplary system architecture that may be used in implementing the system and/or method.

FIG. 17 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting CV Monitoring System 1101, Spatial imaging System 1102, Video Sanitization System 1103, Video Storage System 1104, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc., are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:
1. A method comprising
collecting image data from an environment, comprising collecting a first set of image data from a first imaging device and a second set of image data from a second imaging device;
collecting spatial information corresponding to the image data;
synchronizing spatial information of a plurality of imaging devices including at least the first imaging device and the second imaging device;
selecting a sanitization image region in the image data based at least in part on the spatial information, comprising:
selecting a first sanitization image region in the first set of image data from the first imaging device based at least in part on the spatial information, and
translating spatial information of the sanitization image region to the second set of image data from the second imaging device and selecting a second sanitization image region in the second set of image data; and
applying image sanitization to the sanitization image region thereby generating sanitized image data, com- prising applying image sanitization to the first sanitization image region and the second sanitization image region.

2. The method of claim 1, wherein selecting the sanitization image region in the image data comprises determining a reference sanitization spatial region defined spatially relative to the image data and selecting pixels in the image data based on spatial position of the pixels relative to the reference sanitization spatial region, wherein the pixels selected define the sanitization image region.

3. The method of claim 2, wherein selecting the pixels in the image data based on spatial position of the pixels relative to the reference sanitization spatial region comprises selecting the pixels in the image data that are defined to be spatially behind the reference sanitization spatial region.

4. The method of claim 2, wherein selecting the pixels in the image data based on spatial position of the pixels relative to the reference sanitization spatial region comprises selecting the pixels in the image data that are defined to be spatially in front of the reference sanitization spatial region.

5. The method of claim 2, wherein selecting the pixels in the image data based on spatial position of the pixels relative to the reference sanitization spatial region comprises detecting an object intersecting with a position defined to intersect the reference sanitization spatial region, and selecting the pixels associated with the object.

6. The method of claim 2, wherein the reference sanitization spatial region defines a volume within the environment; and wherein selecting the pixels in the image data based on spatial position of the pixels relative to the reference sanitization spatial region comprises selecting the pixels in the image data that are defined to be spatially within the volume of the reference sanitization spatial region.

7. The method of claim 1, wherein the second imaging device is a mobile imaging device.

8. The method of claim 1, wherein selecting a sanitization image region in the image data based at least in part on the spatial information comprises at a first instance detecting an object in the environment and selecting the sanitization image region to include image data of the object; tracking the object backwards from the first instance within the image data and applying image sanitization to image data of the object; and tracking the object forwards from the first instance within the image data and applying image sanitization to image data of the object.

9. The method of claim 1, further comprising detecting an object registered for image sanitization and wherein selecting the sanitization image region comprises selecting the sanitization image region based on location of the object in the image data.

10. The method of claim 9, wherein the object is one from the group comprising: an automatic teller machine, a document, a personal computer device.

11. The method of claim 1, wherein selecting a sanitization image region in the image data comprises detecting person-object interaction and setting the sanitization image region according to the person object interaction.

12. The method of claim 1, wherein selecting the sanitization image region in the image data comprises detecting a sanitization marker in the image data and positioning the sanitization image region according to the at least one sanitization marker.

13. The method of claim 1, further comprising setting sanitization configuration, wherein the sanitization configuration specifies a reference sanitization spatial region in the image data collected; and wherein selecting the sanitization image region comprises selecting pixel values in the image data based on relative position of pixel values to the defined reference sanitization spatial region.

14. The method of claim 1, wherein applying image sanitization to the sanitization image region comprises redacting the pixel values at least for pixel values within the sanitization image region.

15. The method of claim 1, wherein applying image sanitization to the sanitization image region comprises encrypting pixel values within the sanitization image region.

16. A non-transitory computer-readable medium storing instructions that, when executed by one or more computer processors of a communication platform, cause the communication platform to perform the process of:
  collecting image data from an environment, comprising collecting a first set of image data from a first imaging device and a second set of image data from a second imaging device;
  collecting spatial information corresponding to the image data;
  synchronizing spatial information of a plurality of imaging devices including at least the first imaging device and the second imaging device;
  selecting a sanitization image region in the image data based at least in part on the spatial information, comprising:
    selecting a first sanitization image region in the first set of image data from the first imaging device based at least in part on the spatial information, and
  translating spatial information of the sanitization image region to the second set of image data from the second imaging device and selecting a second sanitization image region in the second set of image data;
  applying image sanitization to the sanitization image region thereby generating sanitized image data, comprising applying image sanitization to the first sanitization image region and the second sanitization image region.

17. The non-transitory computer-readable medium of claim 16, wherein selecting the sanitization image region in the image data comprises determining a reference sanitization spatial region defined spatially relative to the image data and selecting pixels in the image data based on spatial position of the pixels relative to the reference sanitization spatial region, wherein the pixels selected define the sanitization image region.

18. A system comprising of:
  one or more computer-readable mediums storing instructions that, when executed by the one or more computer processors, cause a computing platform to perform operations comprising:
    collecting image data from an environment, comprising collecting a first set of image data from a first imaging device and a second set of image data from a second imaging device,
    collecting spatial information corresponding to the image data,
    synchronizing spatial information of a plurality of imaging devices including at least the first imaging device and the second imaging device,
    selecting a sanitization image region in the image data based at least in part on the spatial information, which includes selecting a first sanitization image region in the first set of image data from the first imaging device based at least in part on the spatial information, and translating spatial information of the sanitization image region to the second set of image data from the second imaging device and selecting a second sanitization image region in the second set of image data, and applying image sanitization to the sanitization image region thereby generating sanitized image data, comprising applying image sanitization to the first sanitization image region and the second sanitization image region.

19. The system of claim 18, wherein the operations further comprise: selecting the sanitization image region in the image data comprises determining a reference sanitization spatial region defined spatially relative to the image data and selecting pixels in the image data based on spatial position of the pixels relative to the reference sanitization spatial region, wherein the pixels selected define the sanitization image region.

* * * * *